United States Patent [19]
Kline et al.

[11] Patent Number: 6,045,651
[45] Date of Patent: Apr. 4, 2000

[54] HAND ASSISTED LAMINATION SYSTEM

[75] Inventors: William T. Kline, Seattle; George V. Neilson; Robert F. Mittelstadt, both of Auburn, all of Wash.

[73] Assignee: The Boeing Company, Seattle, Wash.

[21] Appl. No.: 08/118,368

[22] Filed: Sep. 7, 1993

[51] Int. Cl.$^7$ .............................. B32B 31/20; B32B 35/00
[52] U.S. Cl. ......................... 156/285; 156/350; 156/358; 156/360
[58] Field of Search .............................. 16/350, 358, 360, 16/556, 563, 285

[56] References Cited

U.S. PATENT DOCUMENTS

| | | |
|---|---|---|
| 3,546,740 | 12/1970 | Johnson . |
| 3,614,811 | 10/1971 | Johnson . |
| 3,730,816 | 5/1973 | Crawford .............................. 156/563 X |
| 4,284,462 | 8/1981 | Heine ................................... 156/350 X |
| 4,419,176 | 12/1983 | Valimont et al. ..................... 156/563 X |
| 4,475,976 | 10/1984 | Mittelstadt et al. . |
| 4,512,837 | 4/1985 | Sarh et al. ........................... 156/350 X |
| 4,727,637 | 3/1988 | Buckwitz et al. . |
| 4,776,919 | 10/1988 | Troutner et al. ...................... 156/563 X |

OTHER PUBLICATIONS

Boeing Purchase Order No. B 258096 (Reprint) (5 pages) (Unit prices and Extended prices deleted).
Friz Maschinenbau GmbH, "Membrane Form Presses MFP" (8 pages).
777 News Bulletin, Boeing, vol. 3, No. 28 (Date Aug. 11, 1992) (1 page).

*Primary Examiner*—Curtis Mayes
*Attorney, Agent, or Firm*—Paul C. Cullom

[57] ABSTRACT

A hand assisted lamination apparatus (1) for use in making a laminated composite article, the apparatus (1) including:

(a) a lay-up tool (31) for receiving plies of a composite laminating material;

(b) a support table (34) for supporting the lay-up tool (31);

(c) a vacuum/compressed air system for drawing a vacuum through the support table (34) and for feeding compressed air through the support table (34);

(d) a laser projection system (72) for outlining the location of a ply of the composite laminating material to guide the human operator of the hand assisted lamination apparatus, the laser projection system being capable of projecting a laser beam (30) onto the lay-up tool (31) whereby the laser beam (30) traces the ply outline defined by a data set;

(e) a forming/compaction bag system (35) for forming and compacting a ply of composite laminating material laid on the lay-up tool (31); and (f) an electronic control system (47) for controlling the vacuum/compressed air system, for controlling the laser projection system (72), and for controlling the forming/compaction bag system (35).

24 Claims, 23 Drawing Sheets

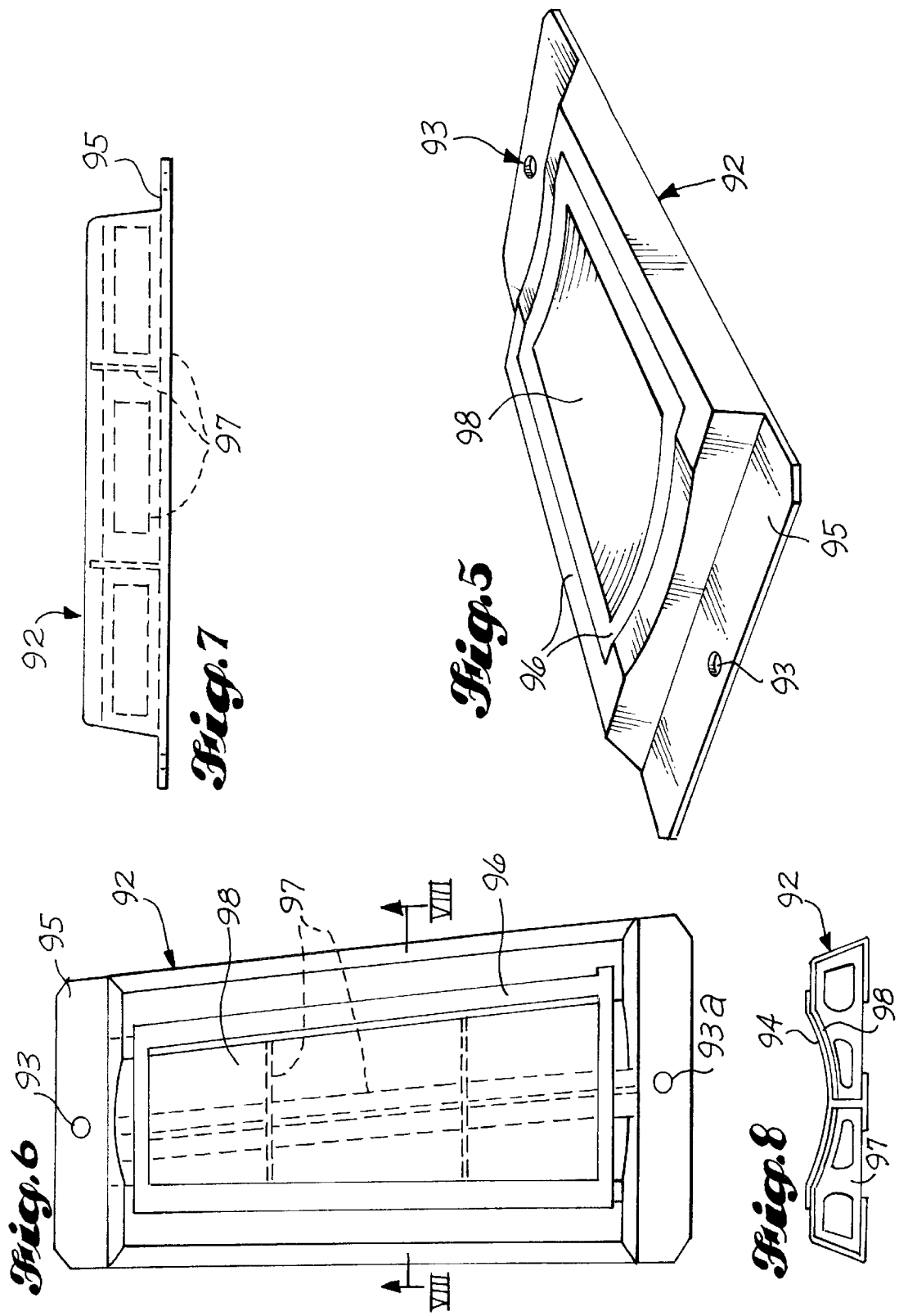

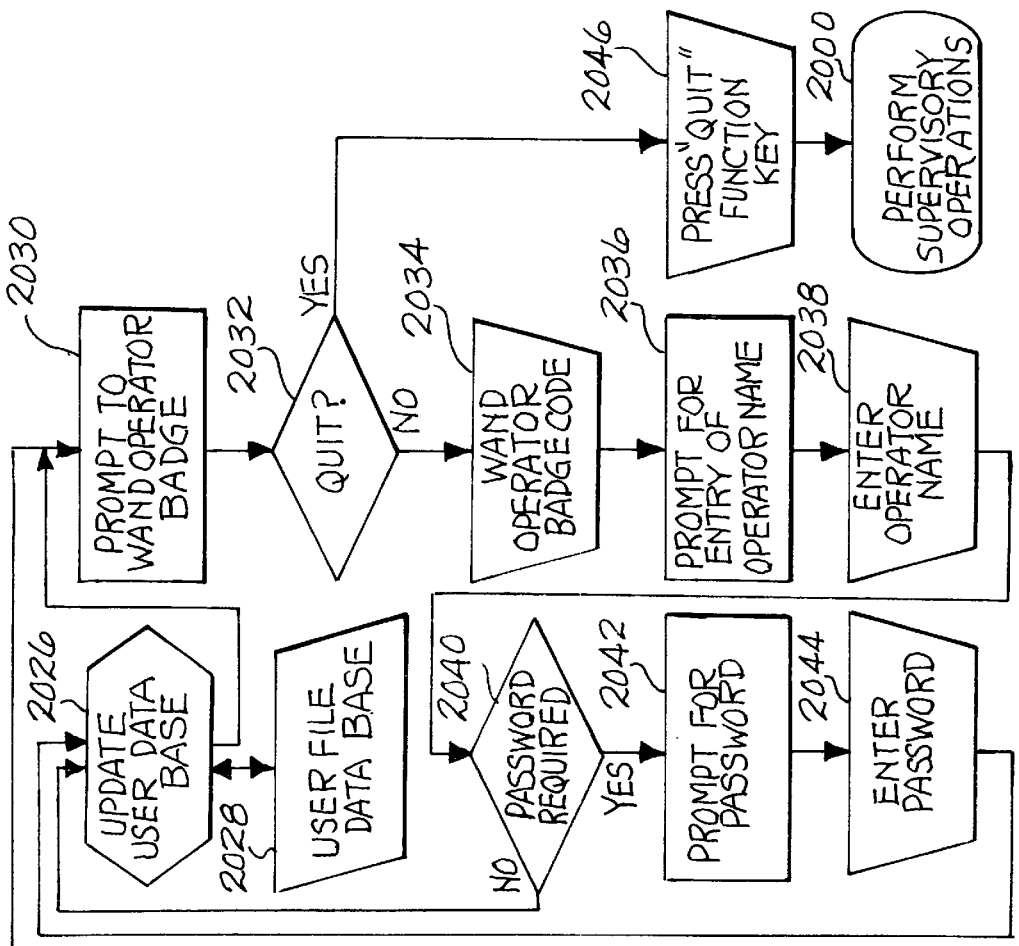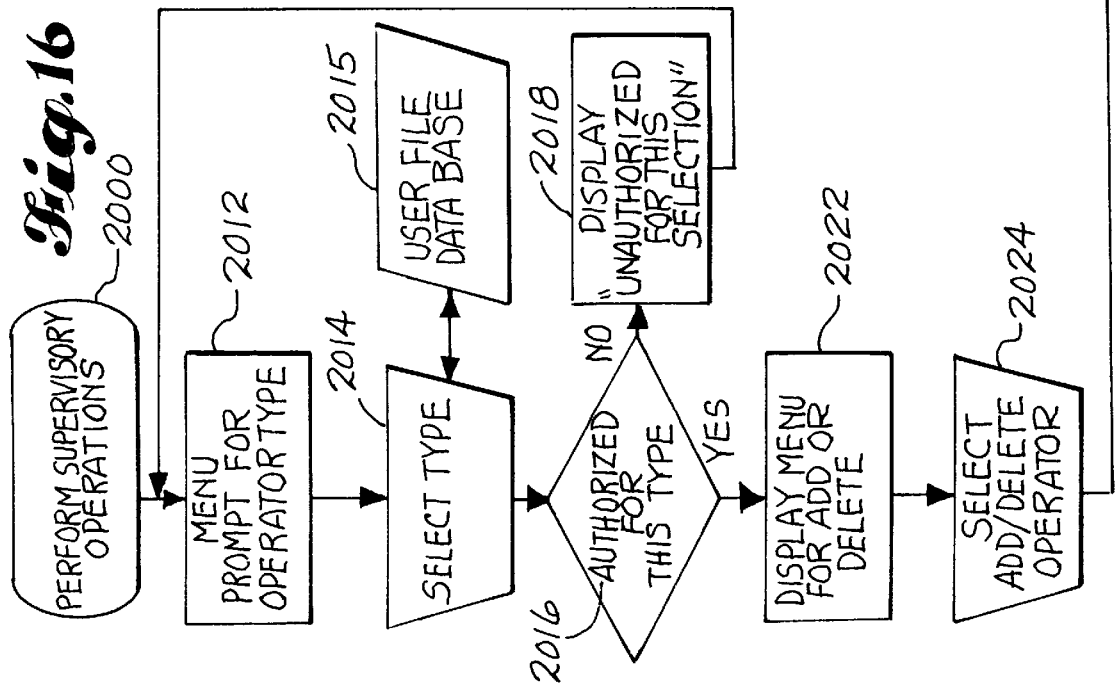
Fig. 16

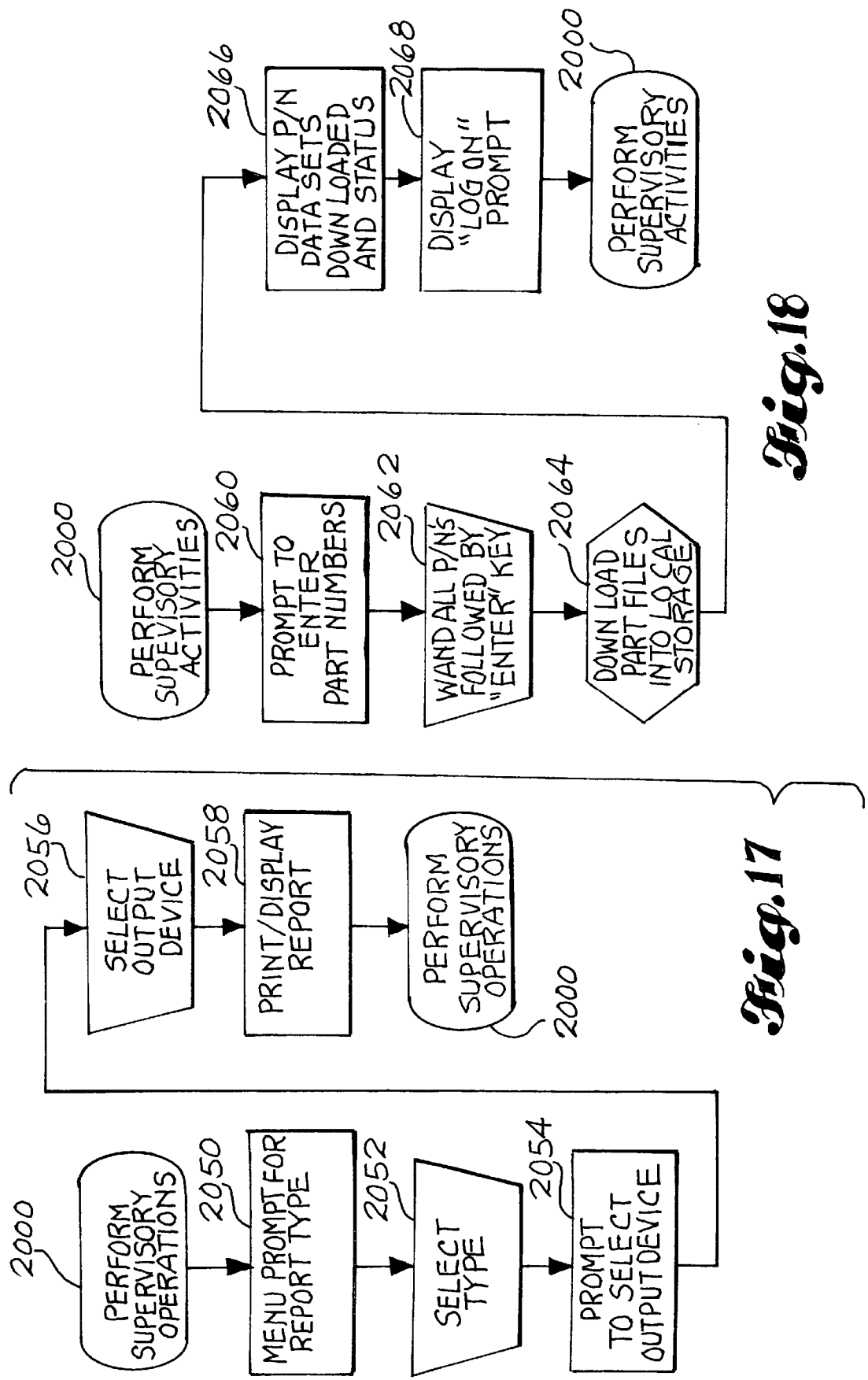

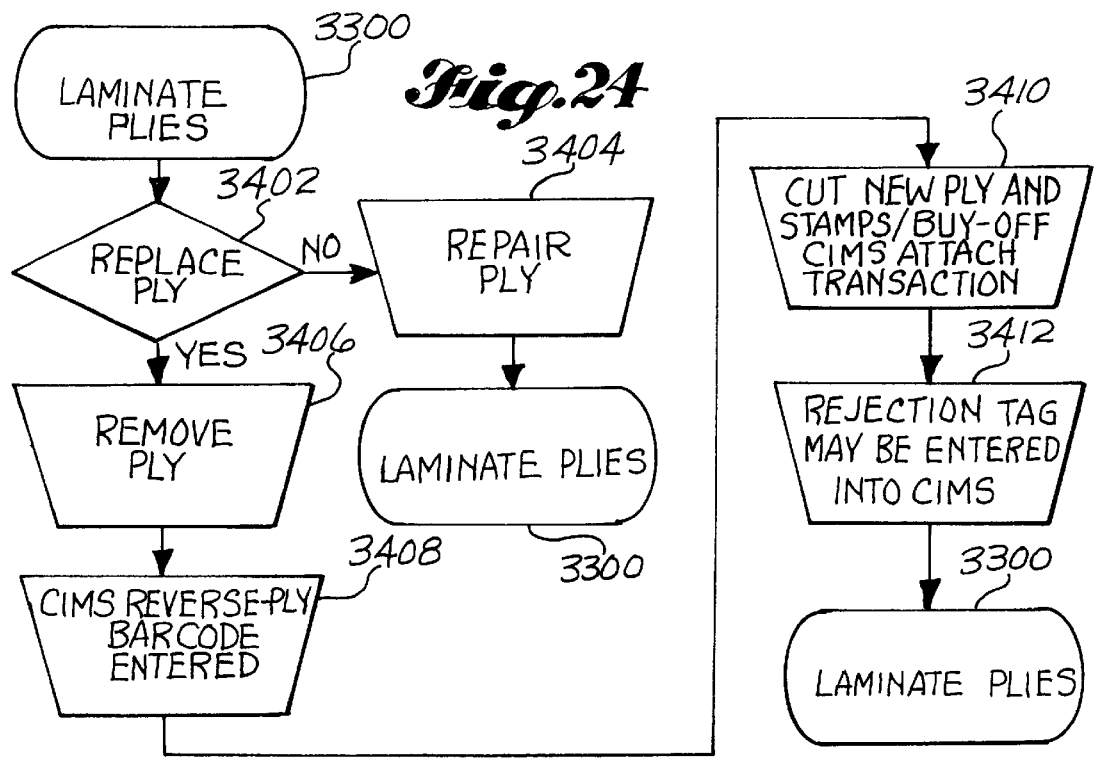
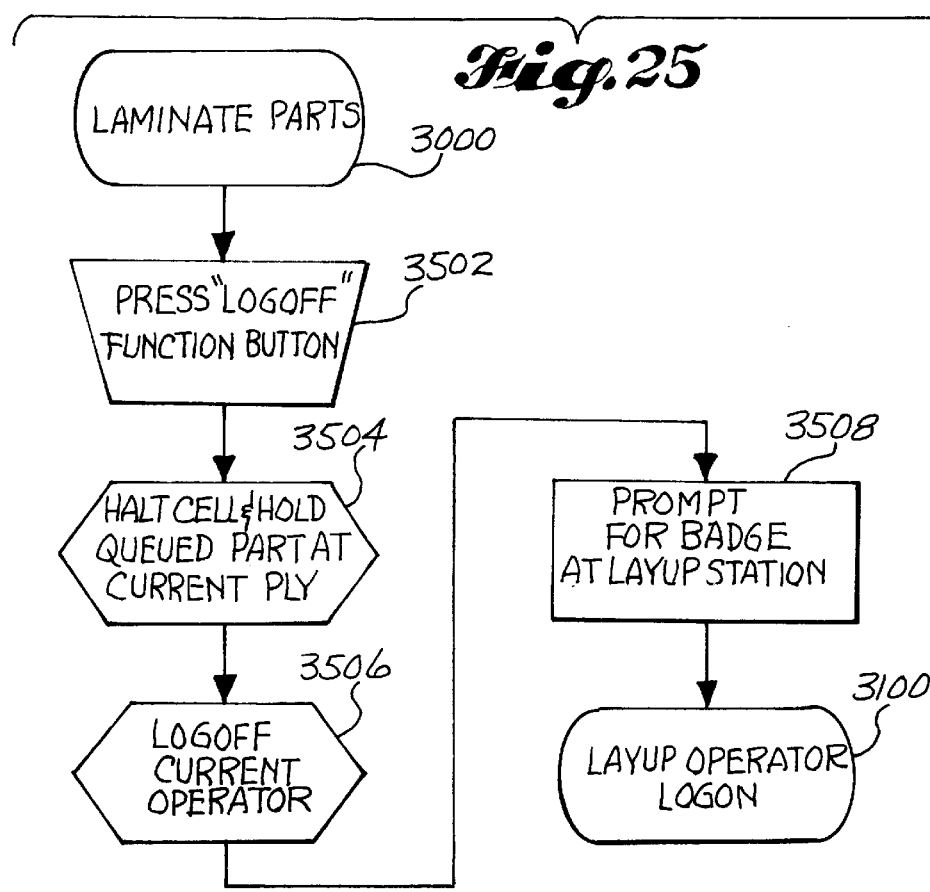

HAND ASSISTED LAMINATION SYSTEM

BACKGROUND OF THE INVENTION

1) Field of the Invention

This invention relates to a hand assisted lamination (HAL) system process and apparatus for forming and compacting composite material in order to make laminated articles that may have three-dimensional (3-D) contoured surfaces. Three-dimensional contoured surfaces are surfaces having an x dimension, a y dimension, and a z dimension (the z dimension being the vertical dimension). More particularly, this invention relates to such a process and apparatus in which plies of a fiber-reinforced prepreg composite material are laid one at a time and then formed and compacted against a lay-up tool that has a three-dimensional contoured surface. This invention can also be described as a computer aided composite material lamination system. The HAL system will have a favorable environmental impact because its use will eliminate a significant amount of waste consisting of prepreg material which was generated unintentionally as the result of operator error in the prior hand lay-up lamination process.

2) Description of the Background Art

In the manufacture of commercial aircraft, the use of fiber-reinforced composite materials to fabricate laminated structural components, for both the primary and the secondary structures of aircraft, is becoming increasingly widespread because of the resulting weight savings which produce fuel savings which are cost savings for commercial airline operators. The fabrication process for producing advanced composite laminates requires that the plies of the prepreg composite material, such as graphite fiber-epoxy materials, be laid one at a time and that the plies be accurately located in various orientations on a lay-up tool (also known as a lay-up mandrel). Each ply must be formed and compacted to conform to the contour of the lay-up tool prior to laying down the next ply. The compaction of each ply serves to remove entrapped air between the plies in order to produce a laminated structural component that is free of porosity and voids. Therefore, each ply must be accurately located and oriented on top of the previous ply and the compaction of each ply against the previous ply on the lay-up tool must be performed before the addition of the next ply. In the prior hand lay-up lamination process, these steps were labor intensive and time consuming; therefore, the resulting structural components were costly.

Thus, there has been a long-felt need to mechanize or automate the fabrication of laminated structural components for aircraft and for other end-uses, such as in automobiles, in order to reduce the cost of the components. In Mittelstadt et al. U.S. Pat. No. 4,475,976, there is disclosed an automated process and apparatus for forming certain types of composite material articles, for example, channel stringers for aircraft. In the example of a channel stringer, a ply of fiber-reinforced composite material in the form of a tape was laid by a tape laying head carried by a gantry. The tape ply was laid onto a lay-up mandrel having a generally U-shaped cross section and having a vacuum-ported upper surface. The tape ply was laid onto the top web of the mandrel, with the side edges of the tape ply being laid in a cantilevered fashion. A flexible bag was inflated into a stretched condition and lowered over the top of the mandrel and the tape ply. The bag rolled over the mandrel to form the tape ply down over the mandrel. As the bag rolled over the mandrel, it folded the tape ply along the two contoured bend lines between the web and flanges of the mandrel and simultaneously restrained the tape ply from folding along a straight line. When fully deployed, the bag engaged a seal carried by the mandrel. A vacuum was then applied through the vacuum ports of the mandrel to evacuate the air from the area between the bag and the mandrel within the seal to compact the tape ply. Each ply of the composite tape material was thus formed and compacted before laying another ply of the tape.

The process of Mittelstadt et al. U.S. Pat. No. 4,475,976, works well and is cost effective in the case where a ply of fiber-reinforced composite material in the form of a tape can be laid by a tape laying head carried by a gantry. But in the case of structural components having more complex three-dimensional contours (i.e., where a tape laying head carried by a gantry, such as described in the Mittelstadt et al. patent above, is not feasible for laying down the plies of prepreg material), a costly hand lay-up lamination process using large hand lay-up templates was employed in which a human operator would lay by hand each pre-cut ply of prepreg composite material in its proper location and orientation on the lay-up tool (i.e., on the lay-up tool or on top of the previous ply of prepreg). For each structural component, the hand lay-up lamination process involved the use of one or more of these hand lay-up templates. The hand lay-up templates were made of a flexible material, had various openings cut therein, and had ply numbers and other indicia written on the top surface of the template adjacent to each opening to guide the operator in using the template. The prior hand lay-up lamination process was accomplished as follows.

The correct lay-up template (hereafter referred to as the hand lay-up template) was located by the operator and placed over the lay-up tool. Each pre-cut ply of prepreg composite material, in its proper sequence, required placing the template over the lay-up tool and securing the template in the proper location and orientation using tooling pins. The operator then made marks through the template openings for that ply number, thereby marking the outline of the next ply on the surface of the previous ply. The operator removed the template from the lay-up tool, and then laid down and formed the ply to conform to the contour of the lay-up tool, the ply being in its proper location and orientation, as indicated by the outline markings, on top of the previous ply.

To compact the ply (that is, to remove the entrapped air between the new ply and the previous ply), the operator placed an FEP sheet (a release sheet made of Mylar coated with Teflon) over the lay-up tool and then on top of the FEP the operator placed a layer of breather material (air weave or fiberglass cloth). On top of those two layers, the operator placed a layer of nylon bagging material that was sealed around the periphery of the lay-up tool using a tacky tape material. Vacuum was then drawn through ports in the nylon bag to compact the ply. The time and pressure were controlled and monitored by the operator. The vacuum was released and the bag layers were removed. The entire process was then repeated for each succeeding ply of prepreg composite material until the required number of plies for the laminated structural component was achieved.

The prior hand lay-up process had the following disadvantages or problems: (1) The possibility of human error by retrieving the wrong hand lay-up template and/or marking an out-of-sequence ply. (2) Costs were incurred for creating, storing, and using the templates. (3) Hand labor was required to fully form the plies. This was costly and contributed to operator fatigue and health problems. (4) The breather material and nylon bagging material would be discarded after each part was completely laminated and this represented recurring fabrication expense. (5) In compacting, the placement of the three layers of material and the sealing of the nylon bagging were hand operations which were fatiguing to operators and not readily automated. They represented recurring labor expense. (6) The critical process parameters of vacuum pressure and time were not consistently applied by human operators. (7) The several layers of material (release sheet, breather, and nylon bagging) were not very stretchable, and thus required careful placement and pleating of the layer of nylon bagging into or onto complex three-dimensional part geometries. Failure to do so caused defects in the final part.

SUMMARY OF THE INVENTION

The present invention, the hand assisted lamination (HAL) system, solves or eliminates many of the foregoing disadvantages of the prior hand lay-up process. The HAL system will lower the cost of fabricating structural components of composite material for aircraft and for other end-uses, such as automobiles, and it will have a favorable environmental impact because it will eliminate the waste consisting of composite prepreg material which was frequently caused by operator error in the prior hand lay-up lamination process.

In the first and second embodiments of the HAL system, which will be described in more detail below, the hand lay-up templates are eliminated and thus the amount of labor time and therefore the cost of fabricating composite structural components that may have three-dimensional contours will be greatly reduced.

The first and second embodiments of the HAL system each include a subsystem comprising a rapidly scanning laser projection system utilizing a three-dimensional (3-D) numerical control (NC) data set projected onto the 3-D contoured surface of the lay-up tool or onto the plies that are already on the lay-up tool. The single laser light beam is rapidly scanned, thus it projects on the lay-up tool what appears to the human eye to be a continuous outline, the outline being the location for the next ply to be laid on the lay-up tool, thereby showing the operator exactly where to lay the next ply. Because the laser beam projected on the lay-up tool functions as a template to guide the human operator in locating and orienting the ply of composite prepreg and because the outline projected by the laser replaces the prior hand lay-up template, the rapidly scanning laser projection subsystem is referred to as the optical lay-up template (OLT).

The structural and operational details of the aforementioned rapidly scanning laser projection system, the optical lay-up template (OLT), are described in two pending U.S. patent applications: (1) U.S. patent application Ser. No. 07/951,603, filed Sep. 28, 1992, now U.S. Pat. No. 5,341,183 issued Aug. 23, 1994 entitled "Method For Controlling Projection Of Optical Layup Template," invented by John W. Dorsey-Palmateer, commonly-assigned to The Boeing Company, and having Attorney Docket No. 89-299; and (2) U.S. patent application Ser. No. 08/113,456, filed Aug. 27, 1993 by U.S. Express Mail No. TB375106699US, now U.S. Pat. No. 5,450,147, entitled "Method For Controlling Projection Of Optical Layup Template Utilizing Cooperative Targets," invented by John W. Dorsey-Palmateer, commonly-assigned to The Boeing Company, and having Attorney Docket No. 89-299A. The two patent applications of John W. Dorsey-Palmateer are hereby incorporated by reference into this patent application. The two patent applications are hereafter referred to as Palmateer patent application 89-299 and Palmateer patent application 89-299A, respectively.

BRIEF DESCRIPTION OF THE DRAWINGS

For a better understanding of the invention, and to show how the same may be carried into effect, reference will now be made, by way of example, to the accompanying figures. In the different figures, elements designated by like reference numerals have corresponding functions.

FIG. 5 is perspective view of a lay-up tool which may be employed in the apparatus of FIG. 1.

FIG. 6 is another perspective view of the lay-up tool of FIG. 5 with the internal structure of the tool shown in phantom.

FIG. 7 is a side view of the lay-up tool of FIG. 5 with the internal structure of the tool shown in phantom.

FIG. 8 is a sectional view taken on the line VIII—VIII shown in FIG. 6.

FIGS. 13–31 are logic flow charts illustrating the modes of operation of the first embodiment of the hand assisted lamination (HAL) system apparatus of FIG. 1. The individual logic flow charts are explained in detail below.

DESCRIPTION OF THE PREFERRED EMBODIMENTS

First Embodiment

Figure 1:
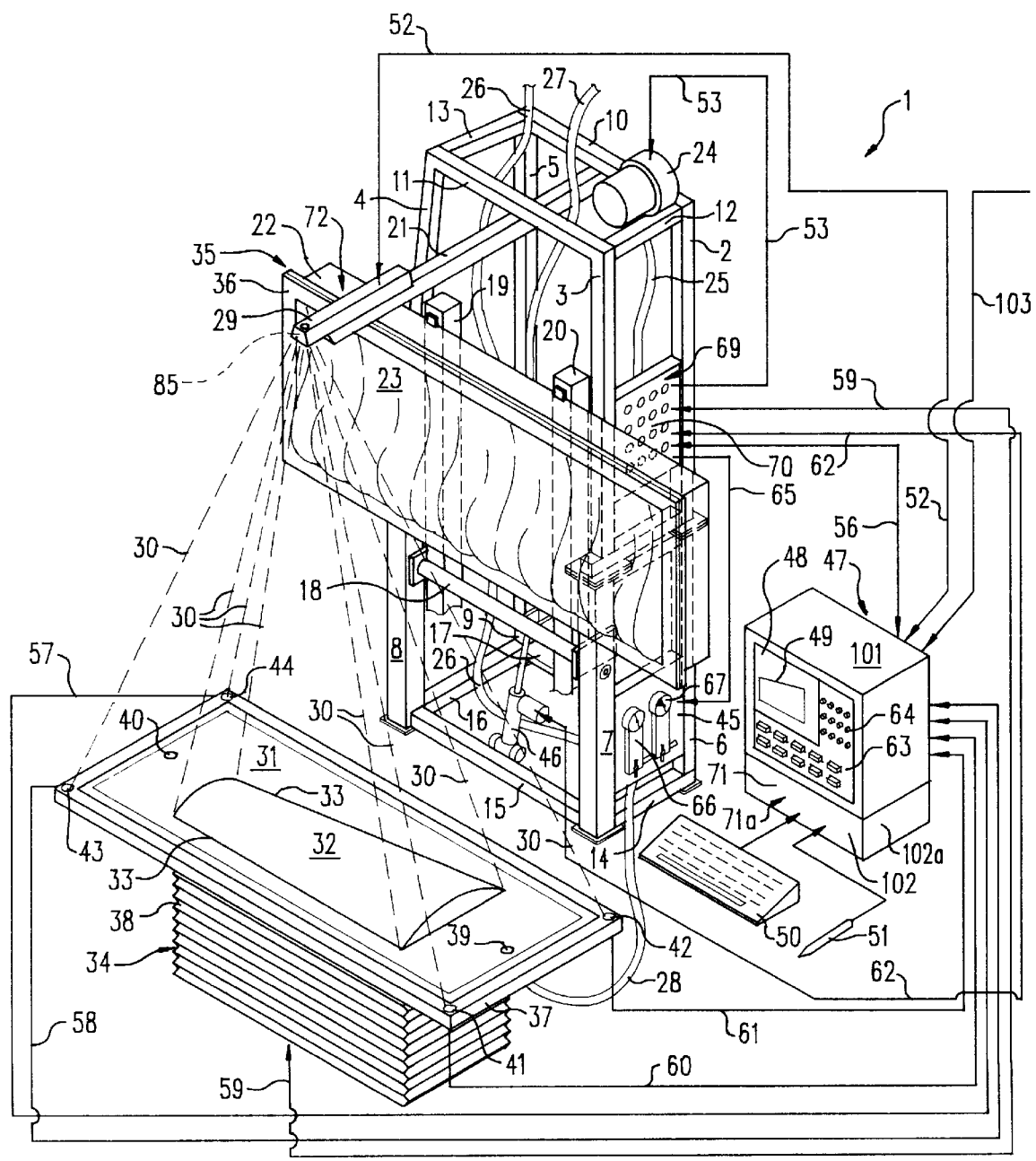
FIG. 1 is a simplified perspective view of the first embodiment of the hand assisted lamination (HAL) system apparatus.

The first embodiment of the invention, the HAL system, includes a numerically controlled laser projector subsystem (described in detail in the Palmateer patent applications that are incorporated by reference herein) as the means for ply marking. When the ply location is marked on the lay-up tool, the operator manually positions the ply in the marked location. In the HAL system, it is not necessary for the operator to completely conform the composite material to the lay-up tool since a reusable forming and compaction bag is incorporated into the system.

After the ply is properly placed on the tool and partially formed to contour, the operator then places a layer of perforated Teflon film over the ply and then initiates the system to do a forming/compaction cycle. The forming and compaction bag then finishes forming the composite material to the shape of the lay-up tool and vacuum compacts the ply. The compaction/forming bag is made of silicone rubber and has a special surface texture that has raised hexagonal pads which are spaced apart on the working surface side of the bag material, the function of the raised pads is to provide an air passage between the pads to allow the vacuum to migrate across the surface of the ply so that a separate breather material is not necessary.

Since forming is partially automated and compaction is performed in a single, time-minimized operation with reduced use of consumable materials, there is a saving of a considerable amount of production time. This method, as compared to the previous hand lay-up method, is less dependent on operator skill and technique. Since the ply shapes and the lay-up sequence are derived directly from the original engineering NC data sets, there are the advantages of not losing tolerances, of eliminating the placing plies out of order (or position), and of the ability to maintain configuration control in a greatly simplified manner (at a much lower cost than hand lay-up templates).

The fabrication process for producing advanced composites laminates requires each ply of the composite material be accurately located and fully formed onto the tool. It must then be compacted to remove entrapped air prior to the addition of the next ply. The production shop must also provide assurance that all plies have been laid up in the proper sequence and at the proper fiber orientations.

The first embodiment of the HAL system assists the operator laminating plies of advanced composite material to: (1) determine ply locations; (2) form plies; (3) compact plies onto the lay-up tool; and (4) automatically assures the operator that all plies are laid in the proper sequence and orientations. This invention will reduce the labor time to locate a ply by up to 95%, to form a ply of material by up to 50%, and the time to compact it by up to 80% as compared to the prior hand lay-up method. Total labor time of all of the lamination operations will be reduced by up to 50%. Other important benefits will include improved quality assurance of the final part, reduced ergonomic problems for the operator (e.g., operator back strain), and capturing of critical process data parameters for statistical process control (SPC) purposes.

Apparatus Description

FIGS. 1–4 are simplified drawings illustrating the first embodiment of the HAL system apparatus. The drawings are simplified in that some features have been omitted for the sake of clarity and some features are shown schematically. In FIG. 1, the HAL workstation or cell 1 includes the following subsystems and elements thereof.

The Computer Control Subsystem

The computer control subsystem or main controller 47 controls the mechanical and electromechanical systems of the HAL cell 1 and the laser projection system 72 of the HAL cell 1. The main controller 47 includes main computer 71, a programmed general purpose digital computer that is mounted inside the console 101. A computer suitable for this purpose would be one that has an Intel 80486 microprocessor. The console has a visual display screen such as cathode ray tube (CRT) 48 that is connected to the computer 71 and that the operator looks at. An input device such as the keyboard 50 is connected to the computer 71. A bar code reader such as the light pen 51 also inputs to the computer 71. An electronic digital data storage or memory device 102 (inside the console 101) is also connected to the computer 71. There is also a removable data storage or memory device 102a connected to the computer 71. For example, the removable data storage device 102a can be a floppy disk. An output printer (not shown) is also connected to the computer 71. The output data to the printer is also sent to the removable data storage device 102a.

The computer control system 47 provides the operator interface and has sufficient control logic to prevent or minimize the possibility of operator errors. This is accomplished by automatically presenting the part data in the proper sequence on the visual display screen 48 to guide and instruct the operator. For example, FIG. 1 illustrates a trapezoidal shape 49, the shape of the current ply, that is being displayed on the CRT 48 to instruct the operator. The image 49 is an accurate representation of the shape of the current ply that the operator will lay down on the lay-up tool 31. The image 49 is also the same shape as the trapezoidal laser beam outline 33 being traced on the lay-up tool 31 by the laser 85, and the actual ply of pre-cut composite prepreg material has the same size and trapezoidal shape as the laser outline 33.

The operator will get the ply from a storage shelf and lay the ply inside the laser beam outline 33 on the lay-up tool. Then the operator will return to the keyboard 50 and enter into the computer 71 that the ply has been laid down. Of course, the trapezoidal shape of the ply shown in FIG. 1 is just one possible example, but the shape of the image 49 on the screen 48 will always be the same shape as the laser beam outline 33 and the size and shape of the ply to be laid down on the lay-up tool will be the same as the laser outline 33.

In the first embodiment of the HAL cell 1 in FIG. 1, the operator is provided with specific function keys on the keyboard 50 in order to operate the HAL cell 1 during the lamination process. Some of these function keys are as follows:

(1) The function key for projecting the ply. This key will cause the current ply, that the operator is working on, to be projected by the laser onto the lay-up tool (or onto the previously laid plies on top of the lay-up tool). The ply number and other pertinent information about the ply will appear on the visual display screen 48.

(2) The function key for increment ply. This key will cause the ply number being projected and displayed to increase to the next ply in the lamination sequence.

(3) The function key for decrement ply. This key will cause the ply number being projected and displayed to decrement to the previous ply in the lamination sequence.

(4) The function key for start form/compact cycle. This key will cause the system to deploy the bag to finish forming the composite material over the lay-up tool and to provide the vacuum compaction cycle of the lay-up process. The vacuum pressure and the time at vacuum is controlled by the system. The timing does not begin until a preset level of vacuum is achieved.

Thus, the HAL cell 1 having its programmed computer control system 47 and the visual display of instructions to the operator on the screen 48, coupled with the subsequent entry of the information into the computer 71 that the work has been accomplished, will force the operator to follow the correct machine operational cycle.

The Laser Projection Control Subsystem

The NC data driven laser projection control subsystem 72 in FIG. 1 is the ply marking device. The laser system 72 projects a beam 30 onto the lay-up tool 31 which traces the ply outline 33. The laser projector 85 is mounted inside a housing 29. A suitable laser projector for this purpose is the product sold under the name OLT 3000 by General Scanning Inc. of Boston, Mass. The laser projection control system, the system of galvanometer mirrors used to direct the laser beam, and the system used to obtain measurements from the signal returning from the analog reference sensors, are explained in more detail in the Palmateer patent application 89-299A which is incorporated by reference herein.

The laser housing 29 is rigidly mounted on a structural arm 21 that is secured to frame members 10 and 11. As explained in the Palmateer patent application 89-299A, the laser beam 30 from the laser projector 85 is controlled by a programmable logic controller. In the HAL cell 1 in FIG. 1, the programmable logic controller that controls the laser projector 85 (and thus the laser beam 30 and the resulting shape of the laser outline 33) is a controller 71a that is located inside the console 101. The laser projection controller 71a includes a second computer (the laser control computer) that is located inside the console 101. A suitable computer for this purpose would be one that has an Intel 80486 microprocessor or one that has a Motorola 68000 microprocessor.

The laser projection controller 71a is controlled by an NC control program downloaded to controller 71a from a file server (not shown) over electrical communication line 103. The NC control program is derived directly from the engineering design data set for the part being fabricated. The laser beam 30 in FIG. 1 also scans analog reference sensors (targets) 41, 42, 43, and 44 mounted in the table 37 to automatically compensate for any movements between table 37 and laser projector 85. This particular type of laser projection system, which uses analog reference sensors mounted in table 37, is the type of laser projection control system described in connection with FIG. 1 of the Palmateer patent application 89-299A. By having reference sensors (targets) 41, 42, 43, and 44 built into the laser projection system 72, it is dimensionally self-compensating to prevent projection errors.

Reference sensors 41, 42, 43, and 44 are connected to electrical communication lines 57, 58, 60, and 61, respectively. As explained in the Palmateer patent application 89-299A, the four analog signals are sent to four buffer amplifiers (not shown) that in turn send four analog output signals to a four channel multiplexer (not shown) that in turn sends an analog output signal to an analog to digital converter (not shown) that in turn sends a digital output signal to laser projection controller 71a. Laser controller 71a then sends digital control data to the laser projector 85 over the bi-directional electrical communication line 52. The laser projection controller 71a is a slave to the main computer 71.

The Compaction Bag Subsystem

In FIG. 1, the compaction bag subsystem 35 has a rectangular support frame 22, an inflatable forming/compaction bag 23 with the equivalent of an integral breather (the pads described above), and a vacuum seal rib 36 mounted around the perimeter of the lower edge of the support box frame 22. The bag system 35 is automatically deployed, sequenced, and timed to form and compact the ply on the lay-up tool 31.

The forming/compaction bag 23 is made from a stretchable silicone rubber material which greatly simplifies the forming and compaction of contoured parts. As stated above, the compaction/forming bag 23 has a special surface texture that has raised hexagonal pads which are spaced apart on the working surface side of the bag material (the side facing the lay-up tool), the function of the raised pads being to allow air passage across the surface of the ply so that a separate breather material is not necessary. A silicone rubber bag material suitable for this purpose is sold under the product number 14116T embossed or the product number 1453D embossed by the Mosites Corporation of Fort Worth, Tex.

The bag 23 is mounted of the bottom side of the rectangular support frame 22 as shown in FIG. 1. On the top side of the support frame 22 is a rectangular plate 81 shown in FIG. 4. The plate 81 is made of clear plastic material. Thus, the bag 23, the support frame 22, and the plate 81 form an enclosure that is a box-like bag house. The bag house is carried on the structural arms 19 and 20. The arms 19 and 20 rotate or pivot around an axle 18 which rotates on bearings mounted in vertical frame members 7 and 8.

The lower end of linear actuator 46 is mounted on the horizontal frame member 15 and the upper end of the shaft of the linear actuator 46 is connected to a clevis mounted on the axle 18. Thus, the retraction or the extension of the shaft of the linear actuator 46 causes the axle 18 to rotate, which in turn causes the arms 19 and 20 and the bag house (support frame 22, bag 23, and plate 81) to rotate in a 90-degree arc, that is, the bag house will rotate from a vertical up position (the stored position in FIGS. 1 and 2) to a horizontal flat position (the deployed position in FIGS. 3 and 4 ).

The reversible motor of the linear actuator 46 receives control signals from the compaction bag subsystem controller 69 over the bi-directional electrical communication line 62 in FIG. 1. The control signals from the controller 69 cause the motor to run in a first direction to extend the shaft of the linear actuator, thereby rotating the compaction bag system 35 down to the deployed position shown in FIGS. 3 and 4. Or the control signal from the controller 69 causes the motor to run in the reverse direction to retract the shaft of the linear actuator as in FIG. 1, thereby rotating the compaction bag system 35 up to the stored position shown in FIGS. 1 and 2. Thus, under the command of the computer control system 47 and the controller 69, the bag system 35 is mechanically rotated down over the lay-up tool 31 without human intervention. It is subsequently rotated up to the stored position to allow the next ply location to be marked by the laser projection system 72 so that the operator can lay down the next ply.

When the operator has laid the ply and then presses the button on the keyboard 50 to start the form/compact cycle (see FIG. 23A), the controller 69 sends a command signal over the electrical communication line 53 to the blower 24 mounted on frame member 12 shown in FIG. 1. The blower 24 then generates sufficient air pressure, which is carried through the hose 25 into the top of the bag house, to inflate the bag 23. The air pressure in the bag house is kept at a constant predetermined level by two air pressure relief valves 84 located on the upper side of the plate 81 shown in FIG. 4. Each valve 84 consists of a circular piece of clear plastic material 83 held in place by four bolts 88 positioned around a circular opening 82 cut through the plate 81. The shaft of each bolt 88 carries a spring under tension. Thus, if the air pressure in the bag house exceeds the predetermined optimum level, the valves 84 open by virtue of the air pressure pushing up on the circles 83 against the springs, thereby allowing air to pass out of the bag house.

Figure 2:
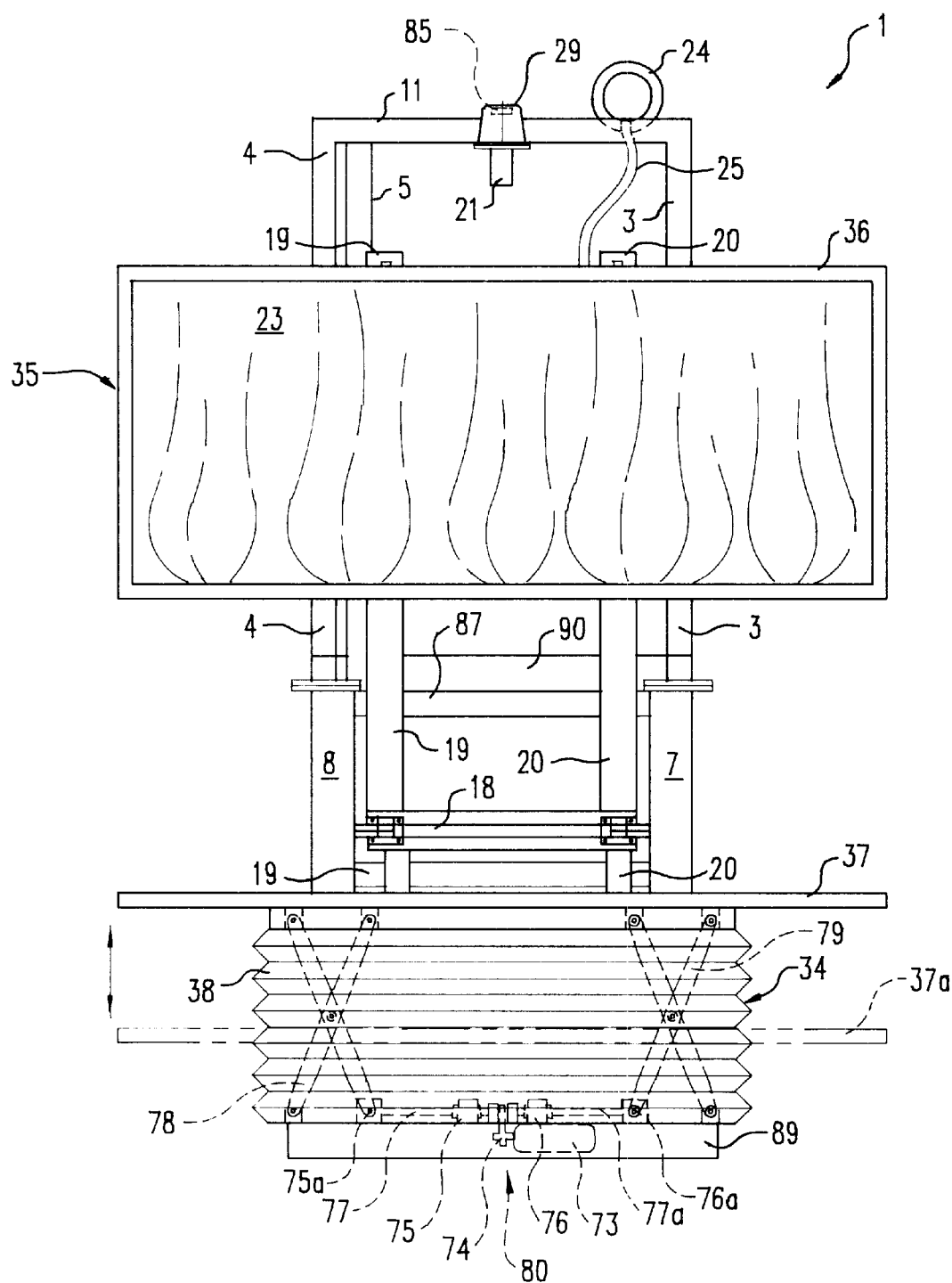
FIG. 2 is a simplified front view of the apparatus of FIG. 1 with the compaction box in the stored position.
Figure 3:
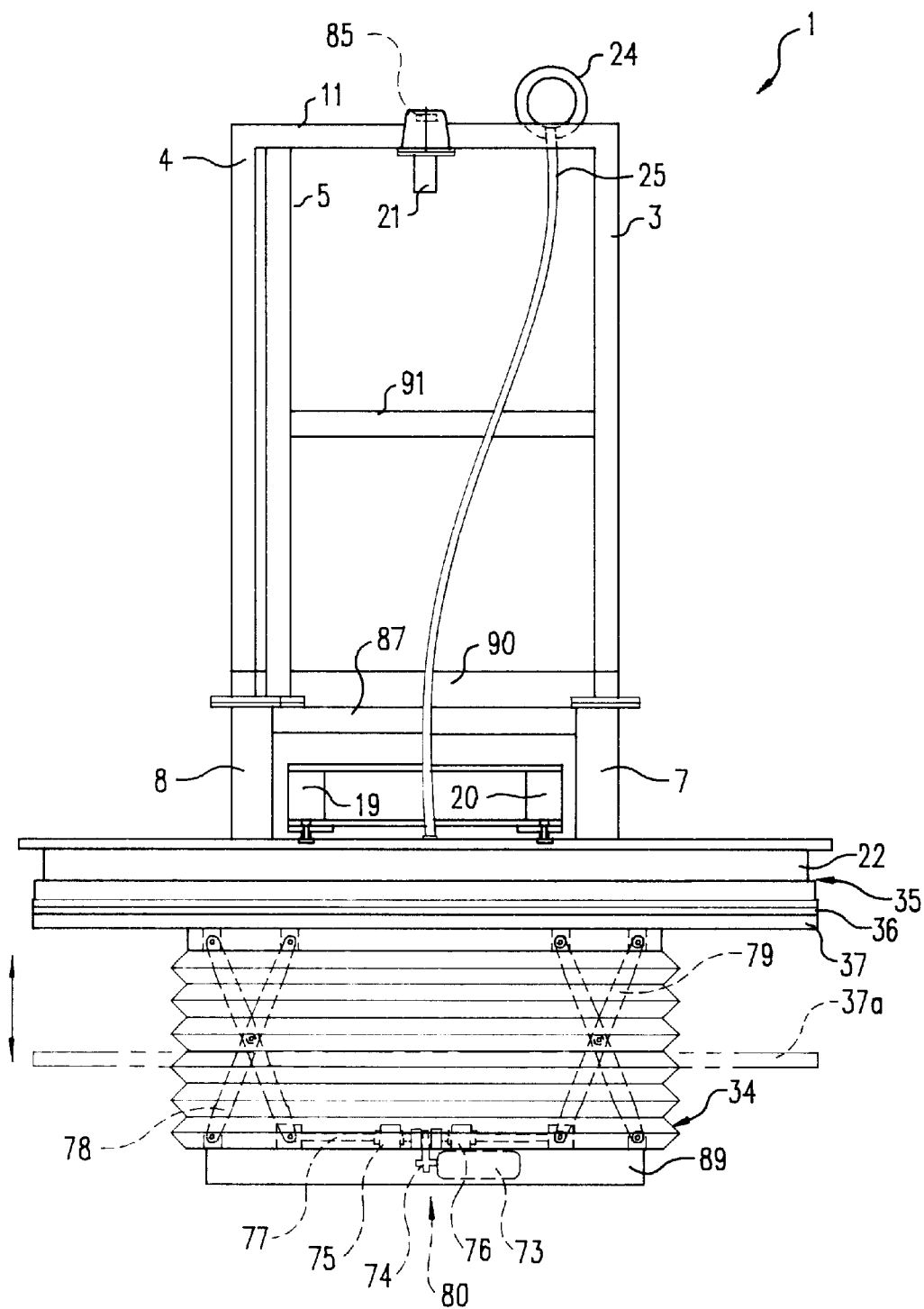
FIG. 3 is a simplified front view of the apparatus of FIG. 1 with the compaction box in the deployed position.
Figure 4:
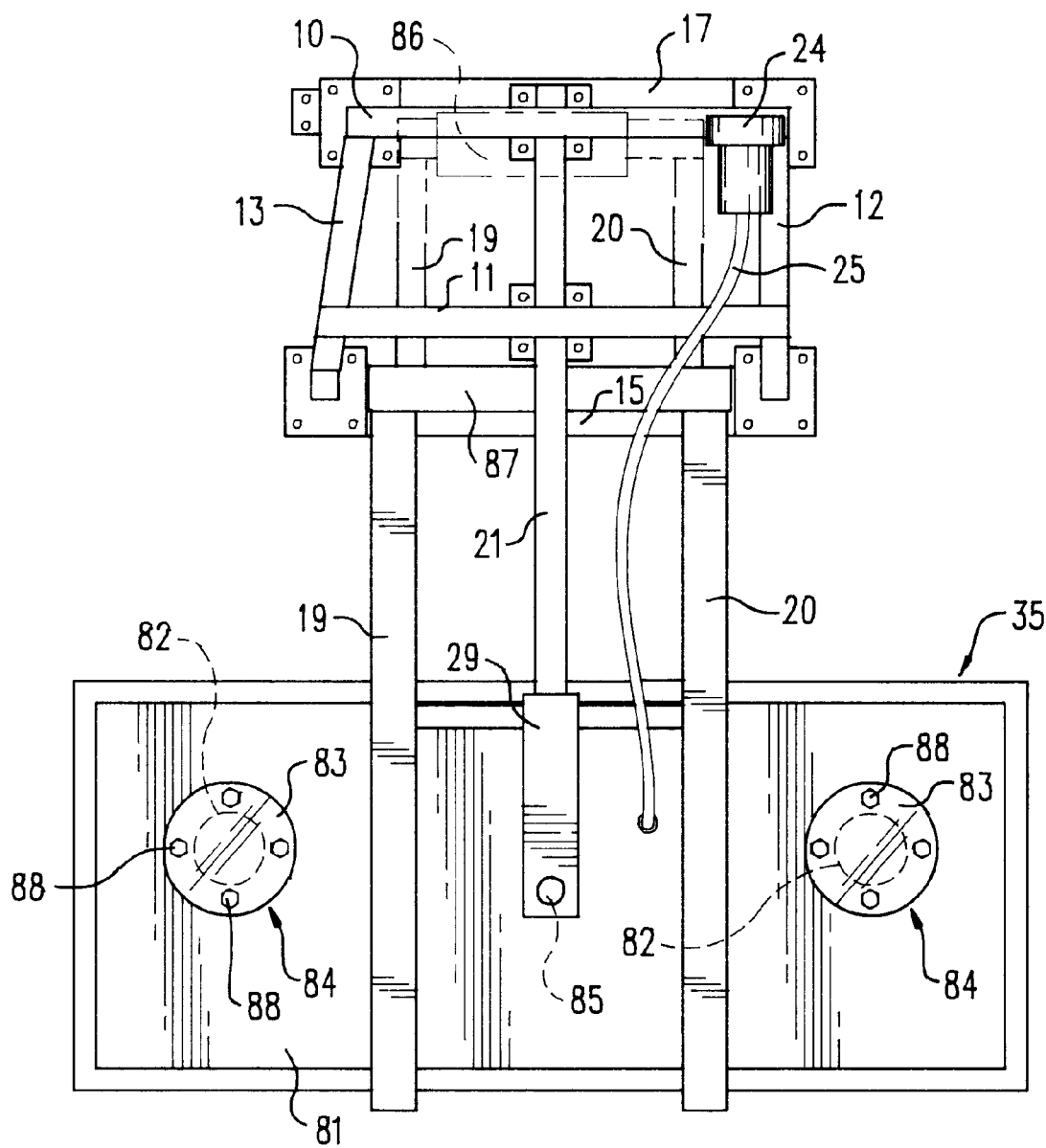
FIG. 4 is a simplified plan view of the apparatus of FIG. 1 with the compaction box in the deployed position.

Before the bag system 35 is rotated down to the deployed position shown in FIG. 3, the smart table 37 supporting the lay-up tool 31 is lowered to the fully-down position indicated by the phantom lines 37a in FIGS. 2 and 3. This lowering of the smart table to the down position is necessary to prevent the inflated bag 23 from brushing or scuffing against the ply on top of the lay-up tool as the bag system arcs down to the horizontal deployed position shown in FIG. 3. After the inflated bag 23 has reached the horizontal deployed position, the smart table 37 is raised up to contact the seal rib 36 on the lower edge of the bag house. At the same time, the inflated bag 23 comes into contact with the lay-up tool 31 and the ply on top of the lay-up tool, thus exerting a compaction force against the ply. And at the same time, a vacuum is started to be pulled across the table 37 as will be described below. The combination of forces acting on the ply—the compaction force of the bag 23 and the force exerted by the vacuum pulling the bag 23 down against the ply more tightly—accomplish the forming and compacting of the ply on the lay-up tool 31.

The Lay-up Tool Support Subsystem

The lay-up tool support subsystem 34 supports and properly positions the lay-up tool 31 in the HAL cell 1. The tool support system 34 includes the vertically movable support table or smart table 37 that, at one point in the cycle as shown in FIG. 1 with the laser projection system operating, supports and positions the lay-up tool 31 at a comfortable working height selected by the operator, and at another point in the cycle, the table 37 retracts to the full down position shown by the phantom lines 37a in FIGS. 2 and 3 before the bag house is rotated down, and at yet another point in the cycle, the table 37 extends to the full up position shown in FIG. 3.

Under the computer control system, the table 37 is lowered to the low position 37a shown in phantom in FIGS. 2 and 3 before the bag is deployed. As stated above, the lowering of the table 37 is performed so that the bag 23 will not brush the top ply on the lay-up tool as the bag rotates down into the horizontal position. When the bag is fully deployed in the horizontal position, the table 37 is then raised to the high position so that the upper surface of the table 37 meets and is sealed by the sealing rib 36 of the bag support frame 22 as shown in FIG. 3.

There is an accordion-like material 38 covering the machinery under the bed of the table. The two scissors-like apparatus 78 and 79 for raising and lowering the table 37 are shown in phantom in FIG. 2 and are mounted on the base 89. A ball screw actuator assembly 80 raises and lowers the table bed by actuating the scissors assemblies. The ball screw actuator assembly includes a reversible motor 73 that drives a double sprocket 74. The double sprocket 74 carries a chain belt that drives a second double sprocket above the first double sprocket. The second double sprocket is mounted on the right end of a threaded shaft 77 supported by a bearing 75. The other side of the second double sprocket is mounted on the left end of a threaded shaft 77a. A movable ball 75 attached to the scissors 78 travels on the left threaded shaft 77 while the movable ball 76 attached to the scissors 79 travels on the right threaded shaft 77a. As may be seen in FIG. 2, when the movable balls 75 and 76 travel away from the center, they raise the scissors 78 and 79. When the movable balls 75 and 76 travel toward the center, they lower the scissors 78 and 79.

In FIG. 1, the bed of smart table 37 will receive two tool locating pins (not shown) which will be placed through the index holes 39 and 40 in the lay-up tool 31 in order to accurately position the tool 31 with respect to the reference sensors (targets) 41, 42, 43, and 44 in order to calibrate the laser projection system 72.

The tool support system 34 also includes a vacuum/compressed air subsystem. In FIG. 1, the vacuum/compressed air system includes a vacuum hose 27 that is connected to a vacuum source (such as the shop vacuum system or a local vacuum pump) and a compressed air hose 26 that is connected to a source of clean compressed air (such as the shop compressed air system or a local air compressor). The compressed air must be clean to avoid contaminating the ply of prepreg composite material. The vacuum hose 27 and the compressed air hose 26 go into the rear side of a vacuum/compressed air regulating panel 45. The vacuum/compressed air regulating panel 45 is a utility panel that contains an air pressure regulator (not shown), a vacuum regulator (not shown), a pressure gauge 66, a vacuum gauge 67, and associated plumbing hardware. A dual-purpose hose 28 runs from the vacuum/compressed air regulating panel 45 to the lower side of support table 37 where it is connected to a fitting (not shown) which in turn connects with various internal air passages (not shown) inside the table 37. The dual-purpose hose 28 carries compressed air during one phase of the cycle and draws a vacuum during another phase of the cycle. Certain of the air passages in the table 37 are used to draw a vacuum through the vacuum ports (not shown) in the upper surface of the table 37 during the forming/compaction cycle and then, after that cycle is complete, compressed air is fed through the hose 28 and in through the same ports in the table to relieve the vacuum on the lay-up tool 31.

Other air internal air passages in the table 37 are used to carry compressed air to a multiplicity of ball casters (not shown) which are mounted in sockets in the upper part of the table 37. When compressed air is fed to the ball casters, the balls rise up in their sockets. The upper portions of the balls thus extend above the surface of the table 37, thereby providing a rolling ball support for the base of the heavy lay-up tool 31 which can thereby be easily moved into position on the table or at the end of the job be moved off the table by riding on the ball casters.

FIGS. 5, 6, 7, and 8 show a lay-up tool 92 made of a durable metal material. Tool 92 is an example of a lay-up tool having 3-D contoured surfaces that may be employed in the HAL cells of FIGS. 1, 32, 33, and 34. Tool 92 has a flat base 95 with index holes 93 and 93a. The contoured central surface area 98 is where the plies of composite prepreg are laid. The special border 96 surrounding the central area 98 is a grit strip. The grit strip 96 has a multiplicity of small raised surface bumps. The grit strip performs the function of providing a friction surface to hold in place and to prevent slippage of the plies during compaction. Specifically, the grit strip provides friction to hold the plies located below and above a piece of honeycomb core that is sandwiched in between those plies as part of the construction. Holding the plies in place during cure protects the honeycomb core from being crushed.

Tool 92 has internal braces and ribs 97, to impart significant strength and rigidity, because lay-up tools must be capable of being lifted by forklifts. The sectional view in FIG. 8 shows several compacted plies 94 of composite prepreg laying on top of the contoured surface area 98.

Figure 9:
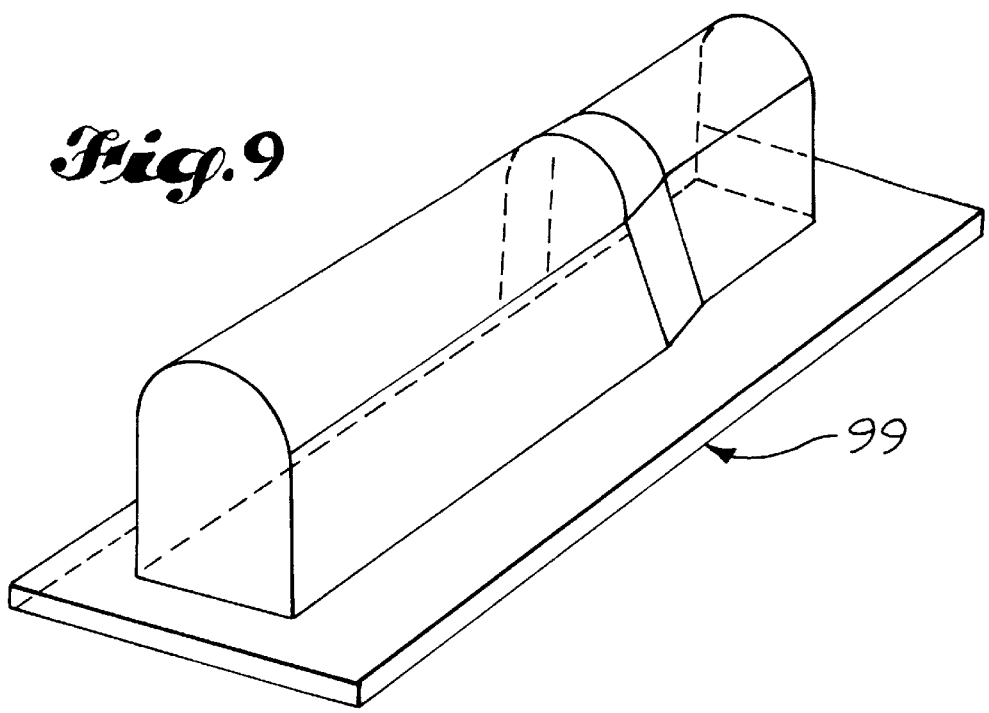
FIG. 9 is a perspective view of another lay-up tool that is hollow and has blocked ends.

FIG. 9 is a hollow steel lay-up tool 99, that has blocked ends and 3-D contoured surfaces, that may be employed in the HAL cells of FIGS. 1, 32, 33, and 34. The silicone rubber bag of the HAL cells will form and compact over the irregular surfaces of tool 99. The part to be made on tool 99 will be fabricated of KEVLAR.

Figure 10:
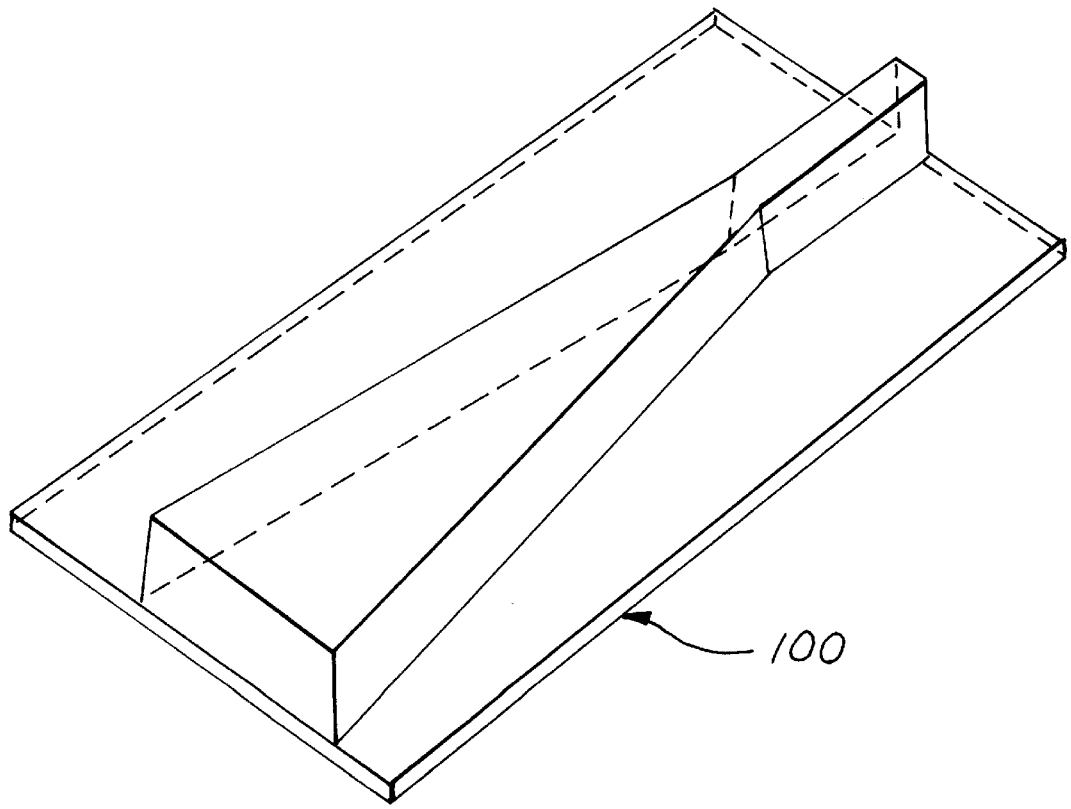
FIG. 10 is a perspective view of another lay-up tool that is hollow and has closed ends. This is a lay-up tool for an aircraft rib.

FIG. 10 is yet another example of a lay-up tool 100 that has 3-D contoured surfaces that may be employed in the HAL cells of FIGS. 1, 32, 33, and 34. Tool 100 is hollow, has closed ends, and is used to make aircraft ribs. Furthermore, tool 100 shows the ability of the silicone rubber bag of the HAL cells to form and compact at converging angles of the tool and part. Tool 100 also shows that a flat sheet of composite prepreg can be totally formed on a tool that has a V-shaped portion.

Figure 11:
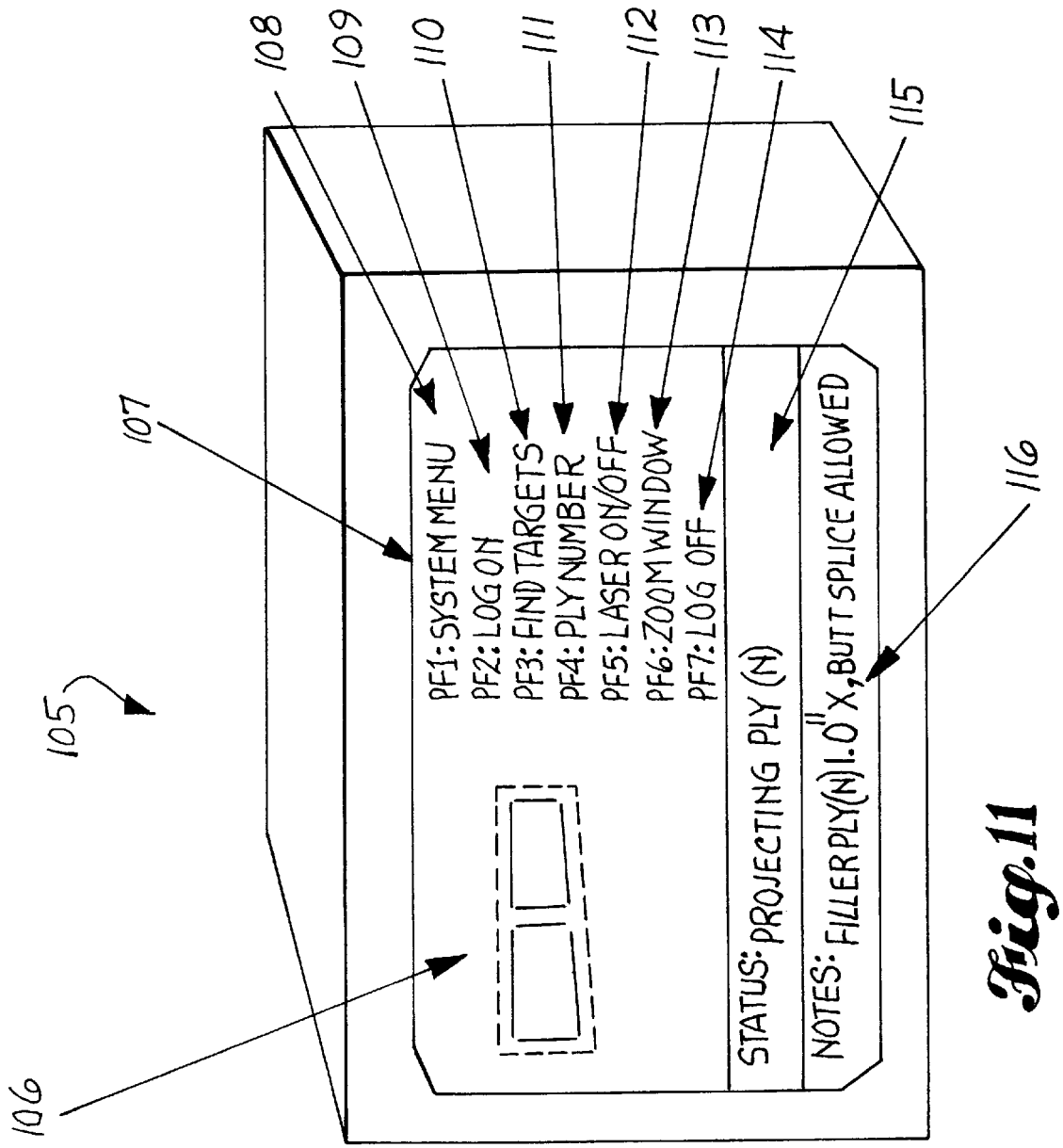
FIG. 11 is a perspective view of an example of an optical lay-up template (OLT) cathode ray tube (CRT) display.

FIG. 11 is a close-up view of an example of an optical lay-up template (OLT) cathode ray tube (CRT) visual display screen 105 divided into three windows. The first window is the ply shape window 106 which displays to the operator the outline(s) projected by the laser for the current ply. In the particular example shown in FIG. 11, window 106 displays a ply that has two separate pieces. The dashed lines in window 106 indicate the periphery of the part. Menu window 107 displays the purposes of the function keys on the keyboard as follows. At arrow 108, the window displays the information that function key PF 1 is system menu. At arrow 109, the window displays the information that function key PF 2 is operator logon. At arrow 110, the window displays the information that function key PF 3 is find targets. At arrow 111, the window displays the information that function key PF 4 is ply number. At arrow 112, the window displays the information that function key PF 5 is laser on/off. At arrow 112, the window displays the information that function key PF 6 is zoom window. At arrow 113, the window displays the information that function key PF 7 is log off.

The second window is the status window 115 which displays prompt, error, and status messages. In the example of FIG. 11, window 115 displays the status that the laser is projecting ply (n), where n would be a specific ply number. The third window is the notes window 116 which displays ply information such as the material, the orientation, the splicing, the tiedown, etc. In the example of FIG. 11, window 116 displays the information that the current ply is a filler ply (n), where n would be a specific ply number, that there is a 1.0 inch XS (excess) (the excess material will be trimmed off after the part is cured), and that a butt splice is allowed.

Figure 12:
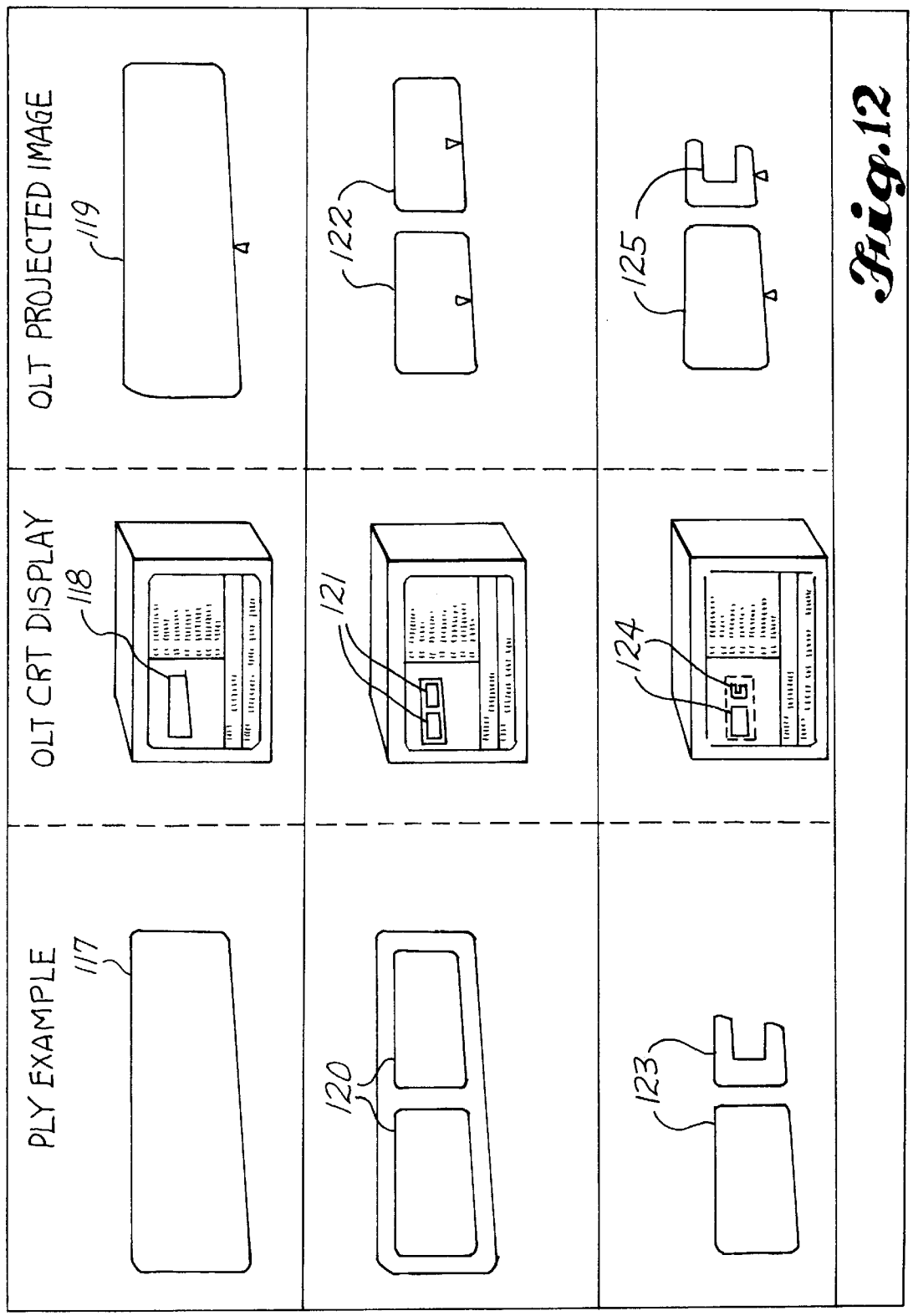
FIG. 12 is in the nature of a table of optical lay-up template (OLT) projection formats. The table has three levels which read across horizontally from left to right and then down to the next level. Each of the three levels of the table illustrate a ply example, the optical lay-up template (OLT) cathode ray tube (CRT) display for that ply example, and the OLT projected laser light image for that ply example (each image is an outline traced by the rapidly scanned laser light beam, the laser beam being represented by an arrowhead).

FIG. 12 is in the nature of a table of optical lay-up template (OLT) projection formats. The table has three levels, which read across horizontally from left to right and then down to the next level. Each of the three levels of the table illustrate a ply example, the optical lay-up template (OLT) cathode ray tube (CRT) screen display for that ply example, and the actual OLT projected laser image for that ply example (each image is an outline traced by the rapidly scanned laser light beam, the laser beam being represented by an arrowhead).

In FIG. 12, the first ply example is a full ply 117. The OLT CRT screen displays the image 118. The actual OLT projected image is the laser outline 119 on the lay-up tool. The second ply example comprises picture frame doublers or filler plies 120. The OLT CRT screen displays the images 121. The actual OLT projected images are the laser outlines 122 on the lay-up tool. The third ply example comprises internal plies or core locations 123. The OLT CRT screen displays the images 124. The actual OLT projected images are the laser outlines 125 on the lay-up tool.

Process Description

During the actual lay-up process, the operator uses the first embodiment of the invention, the HAL cell 1 of FIG. 1, to show him the ply boundary locations (the laser projector projects this information), the ply type (the screen displays this information), and the fiber orientation (the laser projector projects this information onto the lay-up tool and the screen also displays this information). The operator then places the appropriate ply at the correct location and forms the ply on the tool in the areas identified on the display. The operator then spreads a layer of FEP over the partially formed ply. The operator then presses the function key on the keyboard to start the form/compact cycle (described above). The HAL cell 1 finishes the forming process and vacuum compacts the ply on the tool. The operator verifies the workmanship of the ply's lamination, and continues the process routines and subroutines until the part is complete. The tool is then removed and the lay-up process is complete. A record of the process is printed for attachment to the part's documentation as well as being stored electronically in the removable memory 102a.

The process routine and subroutines of the first embodiment, the HAL cell 1 of FIG. 1, can be more fully illustrated by reference to the following flow charts in FIGS. 13–31.

Figure 13:
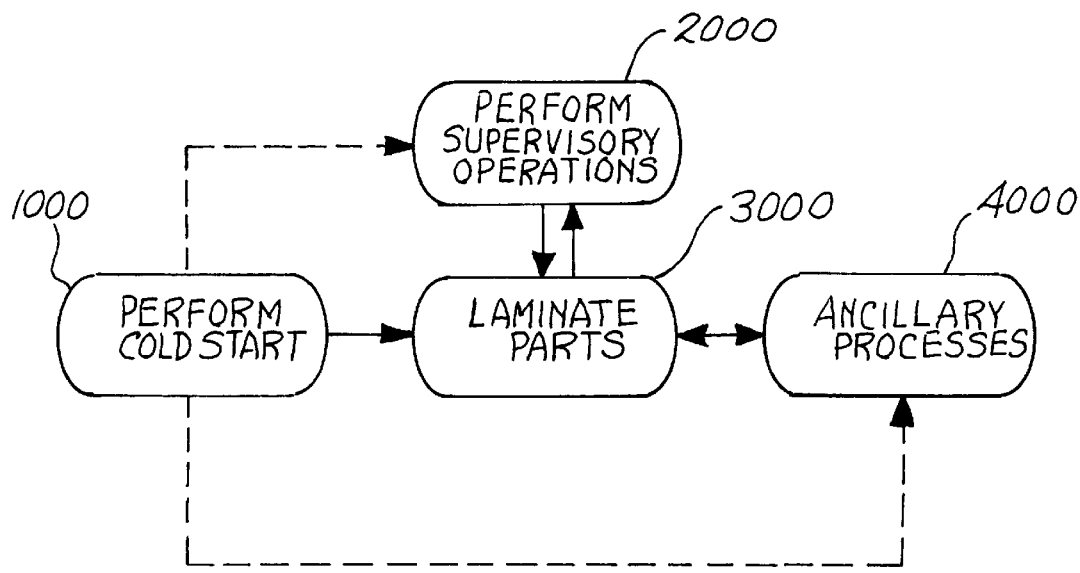

FIG. 13 is a logic flow chart showing the major process blocks in the HAL system operations as follows: major process block 1000, perform cold start (see FIG. 14); major process block 2000, perform supervisory operations (see FIG. 15); major process block 3000, laminate parts (see FIG. 20); and major process block 4000, ancillary processes (see FIG. 26). As shown in FIG. 13, from major process block 1000, perform cold start, the system goes to major process block 3000, laminate parts; the system can also go to major process block 2000, perform supervisory operations, or to major process 4000, ancillary processes. From major process block 2000, perform supervisory operations, the system can go back and forth to major process block 3000, laminate parts. From major process block 4000, ancillary processes, the system can go back and forth to major process block 3000, laminate parts.

Figure 14:
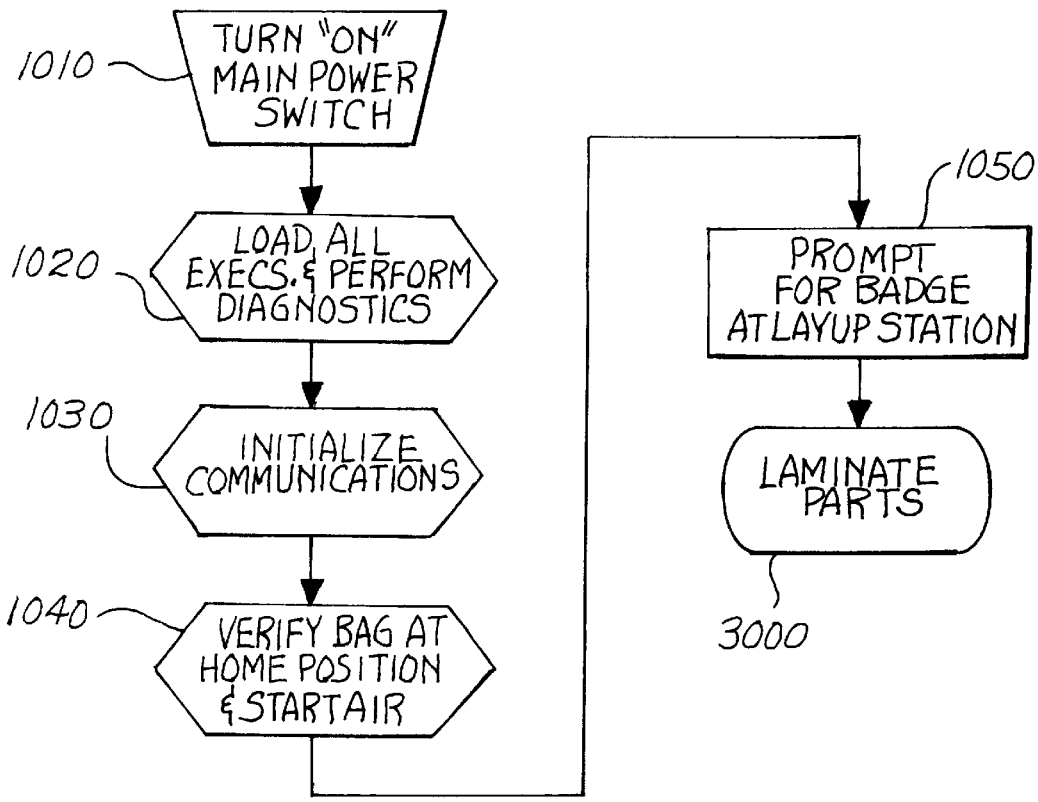

FIG. 14 is a logic flow chart showing the steps of major process block 1000, perform cold start, from FIG. 13. As shown in FIG. 14, manual process block 1010 is turn on main power switch. From block 1010, the system goes to automated process block 1020, load all executives and perform diagnostics. Executives are specific computer operating programs that perform all basic operating functions in the HAL system. For example, there is an executive computer program that performs communications with the operator, and there is another executive computer program that performs line communications for downloading NC control data from the file server.

From block 1020, the system goes to automated process block 1030, initialize communications. From block 1030, the system goes to automated process block 1040, verify the compaction bag is at home position and start the air pressure flowing into the compaction bag. From block 1040, the system goes to block 1050, a screen prompt for the operator to wand his or her identification badge reader at the lay-up station. (To wand the identification badge means to pass the light pen (the wand) of the bar code reader across the bar code on the identification badge so that the bar code reader will read the bar code on the identification badge.) The system then goes to major process block 3000, laminate parts.

Figure 15:
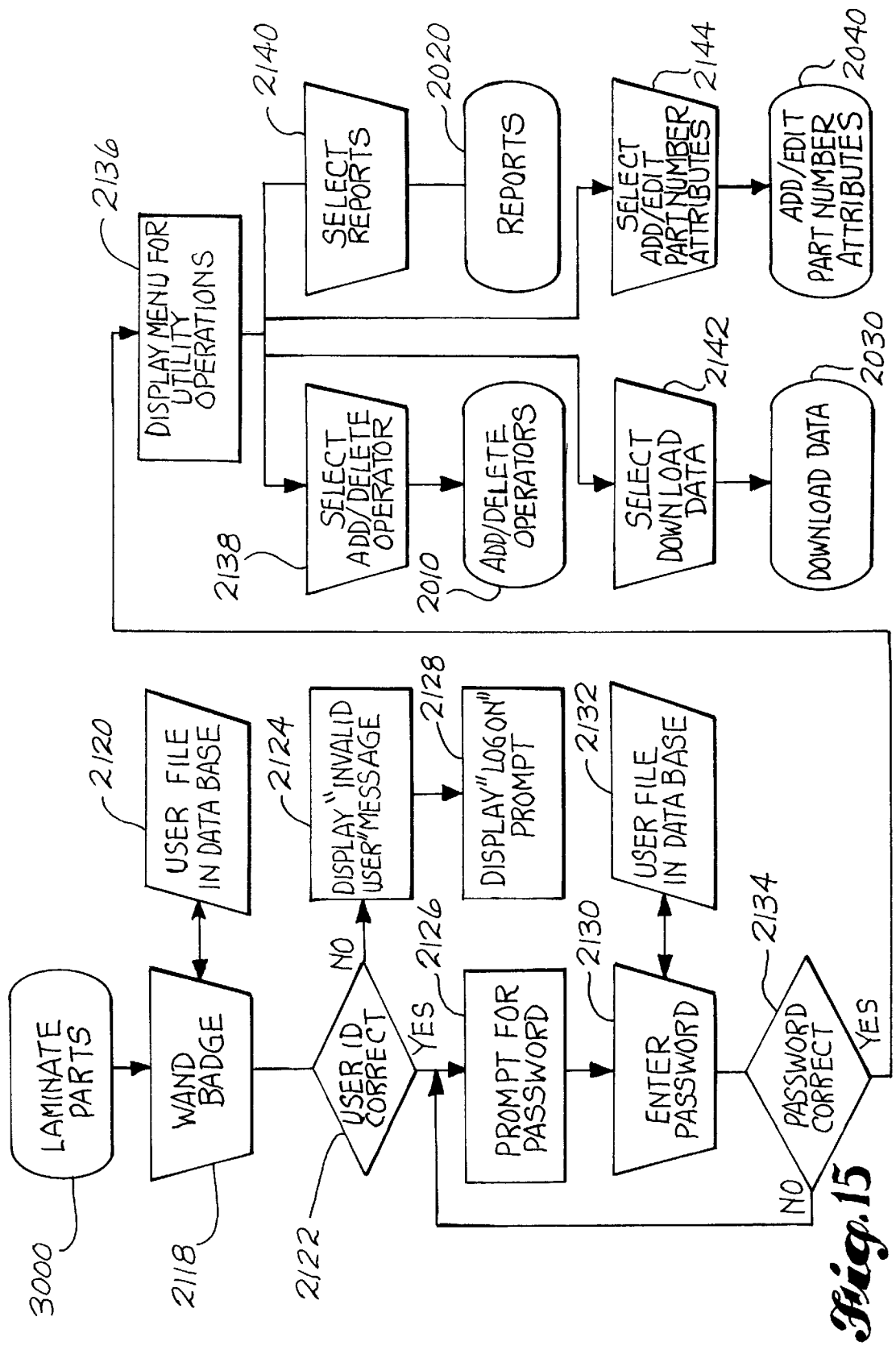

FIG. 15 is a logic flow chart showing the steps in major process block 2000, perform supervisory operations, from FIG. 13. As shown in FIG. 15, from major process block 3000, laminate parts, the system goes to manual process block 2118, where the operator wands his identification badge through the bar code reader. In block 2120, the system accesses the list of authorized users (operators) in the user file in the data base. Decision block 2122 is the question: is the user's identification number in the list of authorized users? If the answer is no, block 2124 displays "invalid user." From block 2124, block 2128 displays the "logon" prompt. If the answer to decision block 2122 is yes, block 2126 displays the prompt for the password. In manual process block 2130, the operator enters the password. The system accesses the authorized passwords in the user file in the data base. Decision block 2134 is the question: is the password correct? If the password was not correct, the system returns to block 2126, the prompt for the password. If the password was correct, the system goes to block 2136, the display of the menu for utility operations. The operator then selects either block 2138, block 2142, block 2144, or block 2140. If the operator selects block 2138, the system goes to process block 2010, which is adding or deleting an operator (see FIG. 16). If the operator selects block 2140, the system goes to process block 2020, which is printing or displaying reports (see FIG. 17). If the operator selects block 2142, the system goes to process block 2030, which is downloading data (see FIG. 18). If the operator chooses process block 2144, the system goes to process block 2040, which is adding or editing part number attributes (see FIG. 19).

FIG. 16 shows the logic steps of process block 2010, the add/delete operator function, from FIG. 15. Referring now to FIG. 16, process block 2000 is perform supervisory operations. Block 2012 is the menu prompt for operator type. In manual process block 2014, the operator type is selected. The system then accesses the user file data base in block 2015. Decision block 2016 is the question: authorized for this type? If not authorized, block 2018 is the display of "unauthorized for this selection." If authorized, the flow goes to block 2022 which displays the menu for adding or deleting an operator. The flow then goes to manual process block 2024 where add or delete operator is selected. In automated process block 2026, the user data base is updated. The user file data base is accessed in block 2028. Display block 2030 prompts the operator to wand the operator's badge by the bar code reader. The flow then goes to decision block 2032, which is the question: quit? If the answer is yes, block 2046 is where the operator presses the "quit" function key. The flow then returns to major process block 2000, perform supervisory operations. If the answer is no, the flow goes to manual process block 2034 wand his identification badge. The flow then goes to block 2036, the prompt for entry of the operator's name. In manual process block 2038, the operator enters his name. The flow then moves to decision block 2040 which is the question: password required? If the answer is yes, the flow moves to block 2042, the prompt for password. In block 2044, the operator enters the password. The flow then returns to block 2026. If the answer is no, the system returns to block 2026.

FIG. 17 shows the steps in process block 2020, the function of print or display reports, from FIG. 15. In major process block 2000, perform supervisory operations, there is display block 2050, the menu prompt for report type. In manual process block 2052, the type of report is selected. The flow then moves to display block 2054, the prompt to select the output device. In manual process block 2056, the output device is selected. In block 2058, the report is printed or displayed. The flow then returns to major process block 2000, perform supervisory operations.

FIG. 18 shows the steps in process block 2030, download data, from FIG. 15. In major process block 2000, perform supervisory activities, there is display block 2060, a prompt to enter part numbers. In manual process block 2062, the operator wands the part numbers followed by the "enter" key. In automated process block 2064, the system downloads the part files into local storage. In message block 2066, the system displays the part number data sets downloaded and their status. Block 2068 is a display of the "logon" prompt. The system then returns to major process block 2000, perform supervisory activities. It may be noted that certain front end processors allow downloading of only one data set at a time. With such hardware, the operator will wand only a single part number for downloading.

Figure 19:
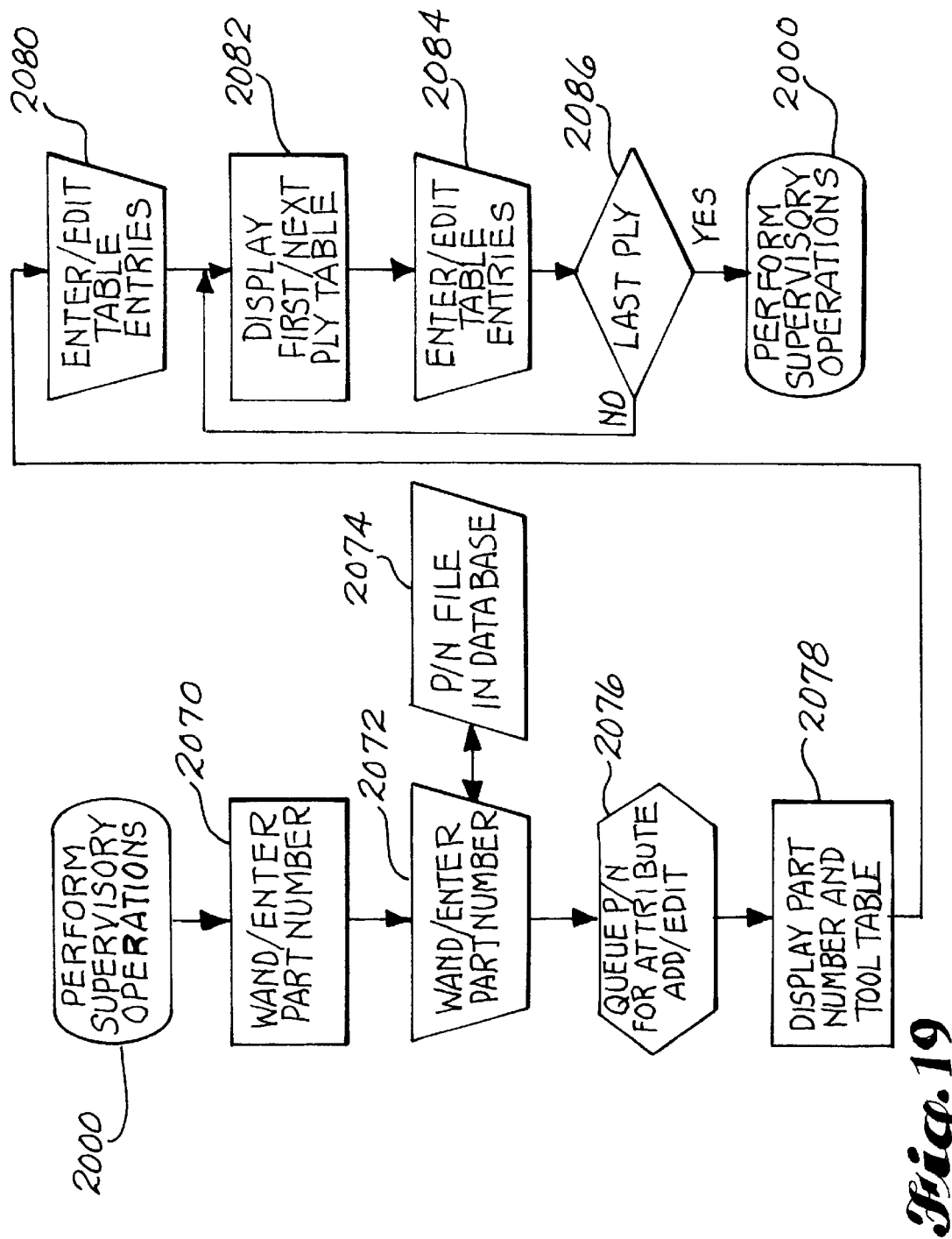

FIG. 19 shows the steps in major process block 2040, add or edit part number attributes, from FIG. 15. In FIG. 19, in major process block 2000, perform supervisory operations, display block 2070 is a prompt to wand or enter the part number. The flow then goes to manual process block 2072, where the operator wands or enters the part number. In block 2074, the system accesses the part number file in the data base. In automated process block 2076, the part number is queued for attribute add or edit. Block 2078 is a display of the part number and tool table. Manual process block 2080 is where the operator enters or edits table entries. Block 2082 is a display of the first or next ply table. Manual process block 2084 is entering or editing table entries. Decision block 2086 asks whether this is last ply? If the answer is no, the flow returns to display block 2082 above. If the answer is yes, the flow returns to major process block 2000, perform supervisory operations.

Figure 20:
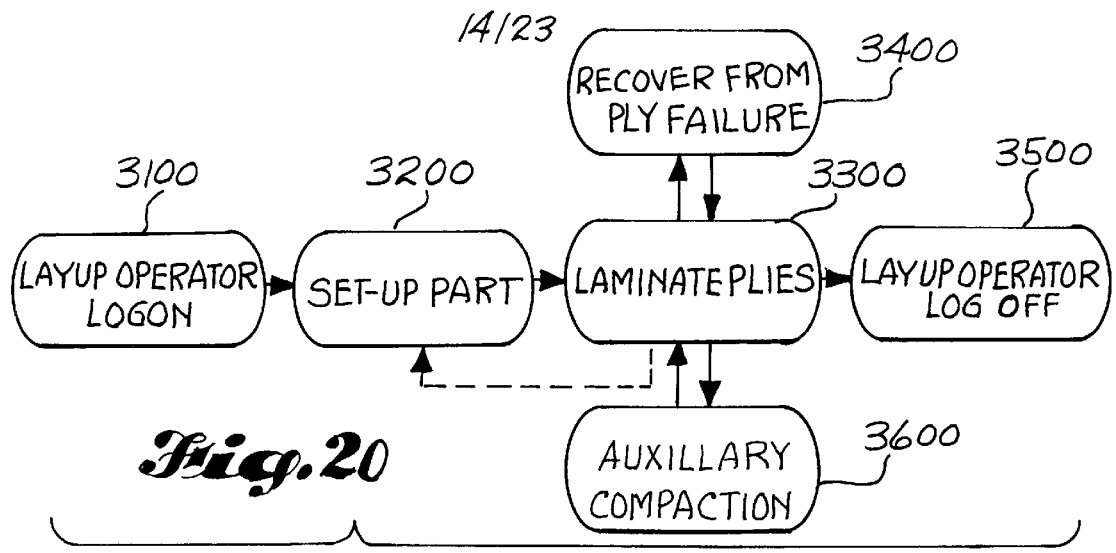

FIG. 20 shows the steps in major process block 3000, laminate parts, from FIG. 13. As shown in FIG. 20, the first step is process block 3100, lay-up operator logon. The flow then moves to major process block 3200, set-up part. The flow then moves to process block 3300, laminate plies. The flow can then go back and forth either to process block 3400, recover from ply failure, or to process block 3600, auxiliary compaction. Also, from block 3300, the flow can go to process block 3500, lay-up operator logoff, or the flow can return to block 3200.

Figure 21:
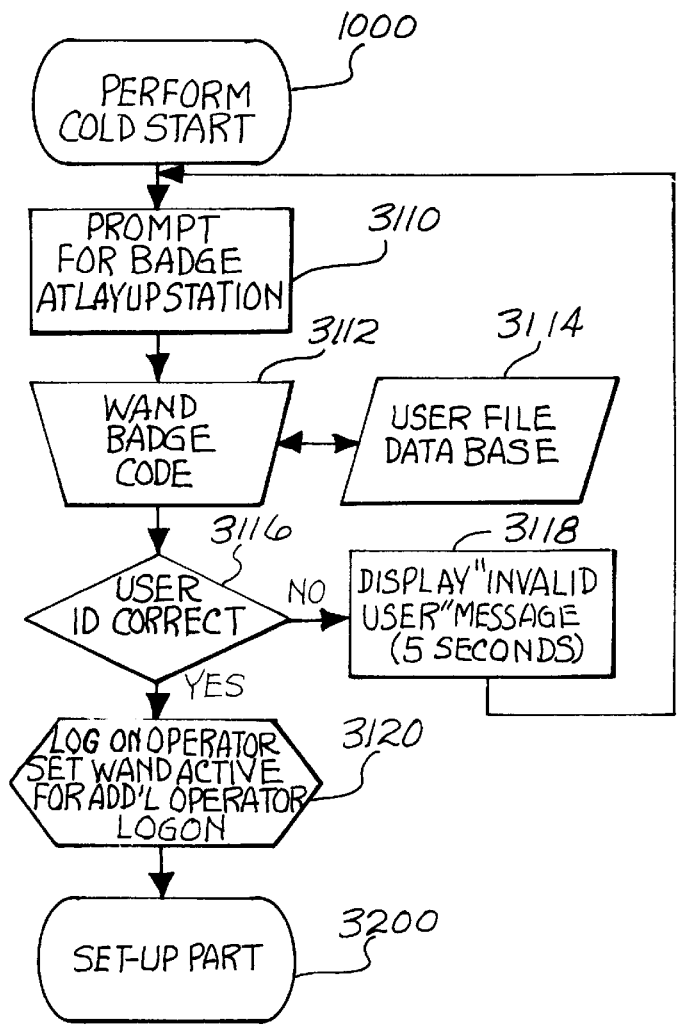

FIG. 21 shows the steps in process block 3100, lay-up operator logon, from FIG. 20. As shown in FIG. 21, in major process block 1000, perform cold start, display block 3110 prompts the operator to wand his or her identification badge through the bar code reader at the lay-up station. The operator then performs manual process block 3112, wanding the badge through the bar code reader. The system then accesses the user file data base in block 3114. The decision block 3116 asks whether the user's identification is correct. If the answer is no, block 3118 displays the "invalid user" message for five seconds. The flow then returns to block 3110. If the answer is yes, the operator is logged on in automated process block 3120. The flow then goes to process block 3200, set-up part (see FIG. 22 explained below).

Figure 22:
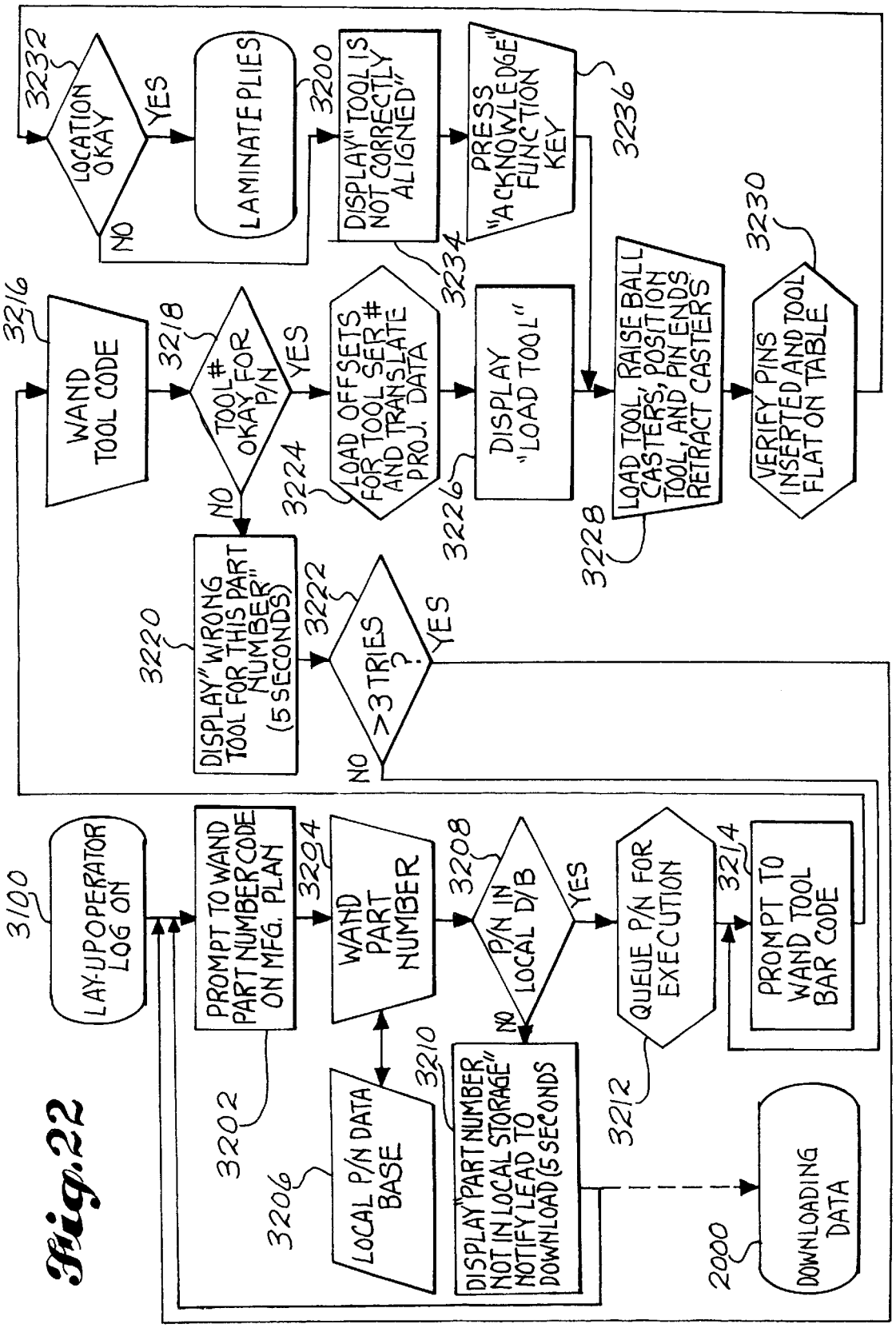

FIG. 22 shows the steps in process block 3200, which is setting up a specific part to be fabricated, from FIG. 20. As shown in FIG. 22, process block 3100 is the lay-up operator logon. Block 3202 prompts the operator to wand the part number bar code on the manufacturing plan for this specific part to be fabricated. (The manufacturing plan for each part is a series of papers that define the manufacturing steps for this specific part.) Manual process block 3204 is wanding the part number bar code by the bar code reader. In block 3206, the local part number data base is accessed in order to retrieve the NC data set for this part. In decision block 3208, the question is whether the NC data set for this part is in the local data base? If the answer is no, block 3210 displays "part number not in local storage." The operator will then notify his supervisor of the situation and the downloading of the data set would then takes place in major process block 2000, downloading data. If the answer is yes, automated process block 3212 queues the part number for execution. Block 3214 prompts the operator to wand the lay-up tool bar code. The flow then goes to manual process block 3216 where the operator wands the tool bar code. Decision block 3218 asks whether the tool number is okay for this part number? If the answer is no, block 3220 displays "wrong tool for this part number" for five seconds. Decision block 3222 asks whether the tool bar code has been wanded more than three times? If the answer is no, the flow returns to block 3214. If the answer is yes, the flow returns to block 3202. In block 3218, if the tool number is okay for this part number, the flow proceeds to automated process block 3224, load the offsets for the tool serial number and translate the laser projection data. The flow goes to block 3226, a display of "load tool." In manual process block 3228, the operator loads the tool by raising the ball casters in the table and then positioning the lay-up tool in the correct location. The operator then place the pins in the index holes of the lay-up tool and retracts the ball casters. Automated process block 3230 verifies that the pins are inserted and that the lay-up tool is flat on the table. Decision block 3232 asks whether the lay-up tool's location is okay? If the answer is yes, the system goes to major process block 3200 which is laminate plies. If the answer is no, the message block 3234 displays "tool is not correctly aligned." In manual process block 3236, the operator presses the "acknowledge" function key. The flow then returns to manual process block 3228 where the operator would correctly align the tool on the table.

Figure 23A:
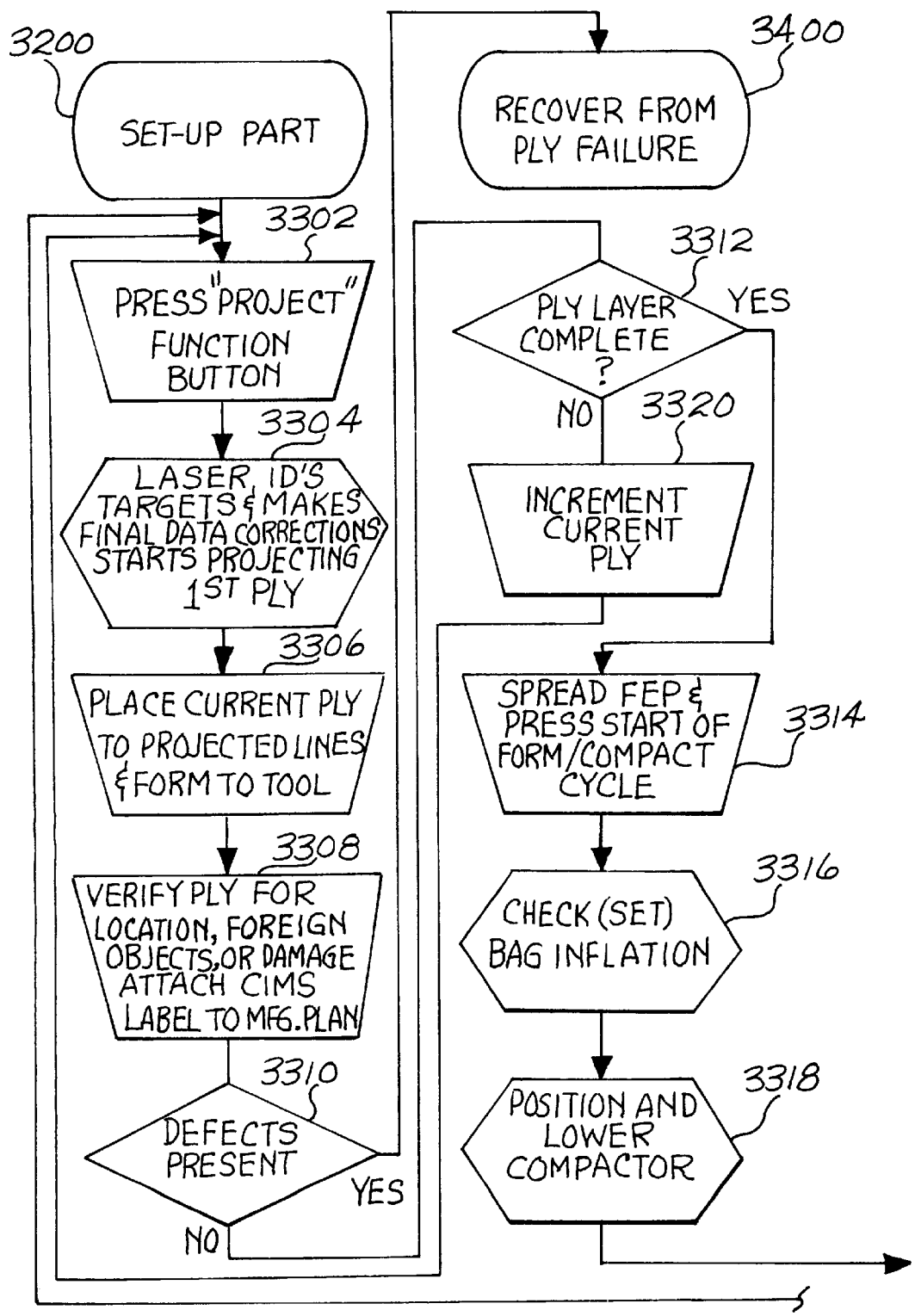
Figure 23B:
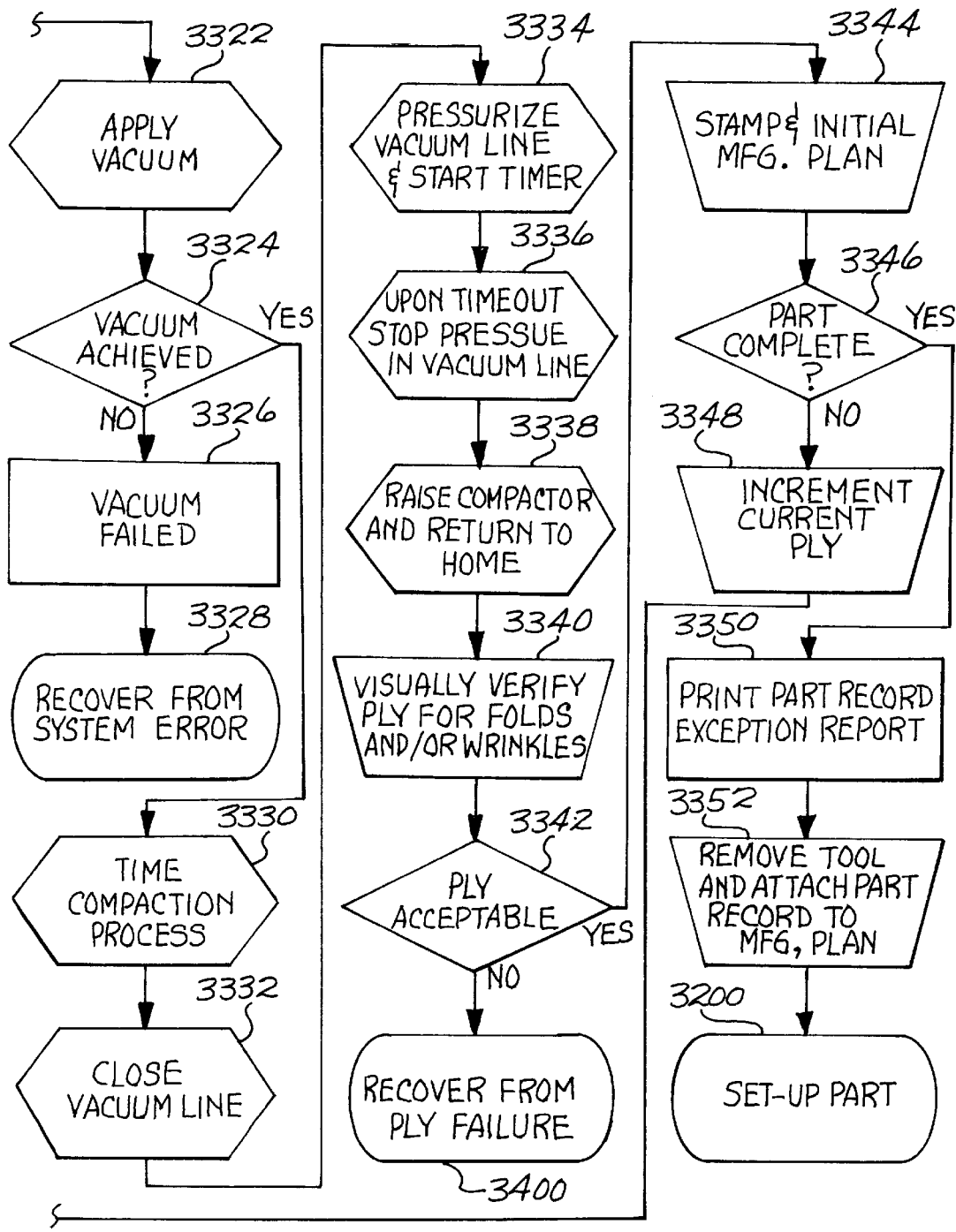

FIGS. 23A and 23B show the steps of process block 3300, laminate plies, from FIG. 20. As shown in FIG. 23A, from process block 3200, set-up part, the flow goes to manual process block 3302 where the operator presses the "project" function button. The flow then goes to automated process block 3304 where the laser identifies the reference targets and makes final data corrections. The laser then starts projecting the first ply. The flow then moves to manual process block 3306 where the operator places the current ply (or the first ply) to the projected lines and forms the ply (by hand operations) to the contoured surface of the lay-up tool. The flow then moves to manual process block 3308 where the operator verifies that the ply is in the correct location; the operator also checks the ply for any foreign objects or for damage to the ply. The operator then attaches the CIMS label to the manufacturing plan for this specific part. (CIMS is an acronym that stands for Composite Information Management System. The CIMS label is a label that identifies, for record keeping purposes, the specific roll of composite prepreg material that was used to make this part.) The flow then goes to decision block 3310 which is the question: are any defects present? If the answer is yes, the flow moves to process block 3400, recover from ply failure (see FIG. 24). If the answer is no, the flow moves to decision block 3312 which is the question: is the ply layer complete? If the answer is no, the flow moves to manual process block 3320 where the operator increments the current ply. The flow then returns to manual process block 3302, where the operator presses the "project" function button. If the answer to decision block 3312 is yes, the flow moves to manual process block 3314 where the operator spreads the FEP (a release film) over the tool and presses the button to start the form/compact cycle. The flow moves to automated process block 3316 which is check (or set) bag inflation. The flow moves to automated process block 3318 which is position and lower compactor. The flow continues with the steps shown in FIG. 23B.

As shown in FIG. 23B, the next step is automated process block 3322, apply vacuum. The next step is decision block 3324 which is the question: vacuum achieved? If the answer is no, the process moves to block 3326, which displays the message vacuum failed. The flow then moves to process block 3328, which is recover from system error. If the answer to block 3324 is yes, the flow moves to automated process block 3330, time compaction process. The process then moves to automated process block 3332, close the vacuum line. The flow then moves to automated process block 3334, pressurize the vacuum line and start the timer. The flow then moves to automated process block 3336, upon time out stop pressure in vacuum line. The flow then moves to automated process block 3338, raise the compactor and return to home position. The flow then goes to manual process block 3340, where the operator visually verifies the ply for folds and/or wrinkles. The flow then moves to block 3342 which is the question: is the ply acceptable? If the answer is no, the flow moves to process block 3400, recover from ply failure (see FIG. 24). If the answer to block 3342 is yes, the flow moves to manual process block 3344, stamp and initial the manufacturing plan. The flow then moves to decision block 3346 which is the question: is the part complete? If the answer is no, the flow moves to manual process block 3348 which is increment the current ply. The flow then returns from block 3348 to manual process block 3302 in FIG. 23A, which is press "project" function button. If the answer to block 3346 is yes, the flow moves to display block 3350 which displays print part record and exception report. The flow then moves to manual process block 3352 where the operator removes the lay-up tool and attaches the part record to the manufacturing plan. The flow then returns to process block 3200 which is to set-up the next part (see FIG. 22 above).

FIG. 24 shows the steps of process block 3400, recover from ply failure, from FIG. 20. As shown in FIG. 24, from process block 3300, laminate plies, the flow moves to decision block 3402 which is the question: replace ply? If the answer is no, the flow moves to manual process block 3404, where the operator manually repairs the ply. The flow then returns to process block 3300, laminate plies. If the answer to block 3402 is yes, the flow moves to manual process 3406, where the operator manually removes the ply. The flow moves to manual process block 3408, where the operator enters the CIMS reverse-ply transaction bar code. The flow moves to manual process block 3410, where the operator cuts a new ply and stamps the manufacturing plan and dates it. The operator then enters a CIMS-attach transaction to document the new material. The flow moves to manual process block 3412 where the operator may enter the rejection tag into the CIMS. The flow then returns to process block 3300, laminate plies.

FIG. 25 shows the steps in process block 3500, lay-up operator logoff, from FIG. 20. As shown in FIG. 25, from process block 3000, laminate parts, manual process block 3502 is where the operator presses the "logoff" function button. Automated process block 3504 halts the cell and holds the queued part at the current ply. Automated process block 3506 is logoff current operator. Block 3508 displays the prompt for the next operator to wand his identification badge at the lay-up station. The system flow then goes to process block 3100, lay-up operator logon (see FIG. 21).

Figure 26:
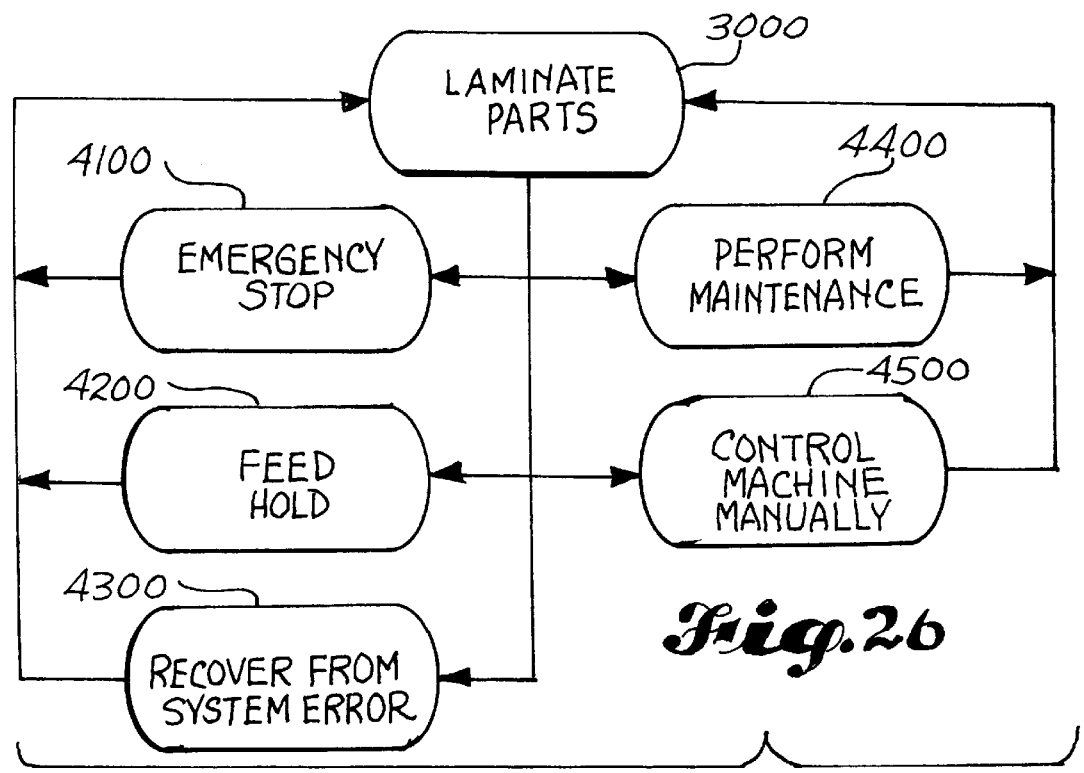

FIG. 26 shows the steps of major process block 4000, ancillary processes, from FIG. 13. As shown in FIG. 26, from process block 3000, laminate parts, the system flow can go to either process block 4100, emergency stop (see FIG. 27), or to process block 4200, feed hold (see FIG. 28), or to process block 4300, recover from system error (see FIG. 29), or to process block 4400, perform maintenance (see FIG. 30), or to process block 4500, control machine manually (see FIG. 31). As shown in FIG. 26, from process block 4100, emergency stop, the system flows back to process block 3000, laminate parts. The same holds true for process block 4200, process block 4300, process block 4400, and process block 4500.

Figure 27:
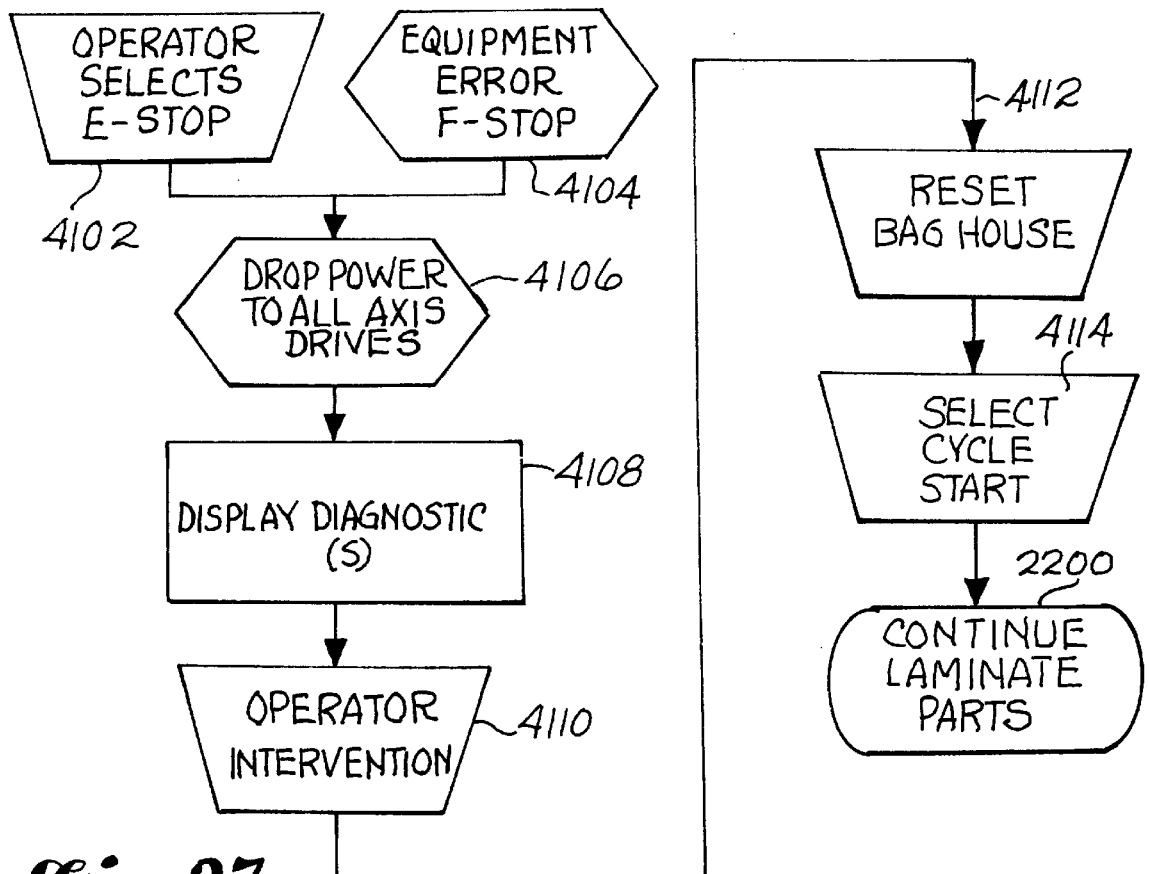

FIG. 27 shows the steps of process block 4100, emergency stop, from FIG. 26. As shown in FIG. 27, in manual process block 4102, the operator selects emergency stop or in automated process block 4104 an equipment error causes an emergency stop. Automated process block 4106 is drop power to all axis drives. Block 4108 is a display of the diagnostics. Manual process block 4110 is operator intervention. Manual process block 4112 is reset bag house. Manual process block 4114 is select cycle start. Process block 2200 is continue laminate parts.

Figure 28:
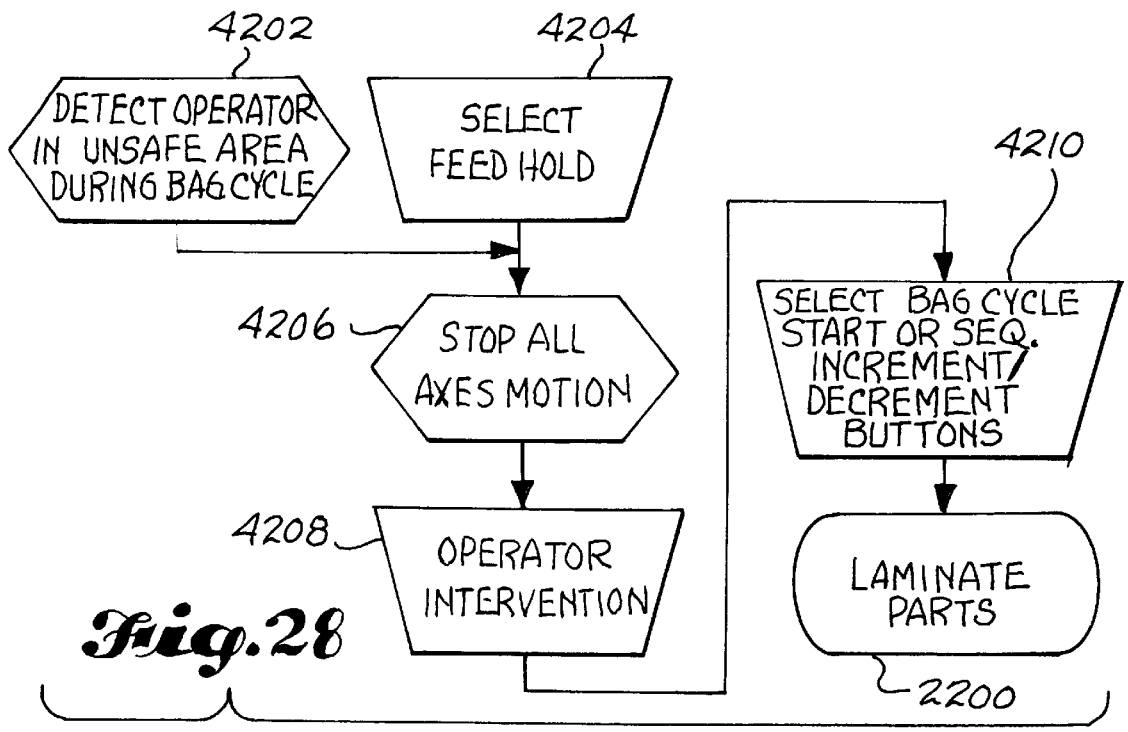

FIG. 28 shows the steps of process block 4200, feed hold, from FIG. 26. Automated process block 4202, detect operator in unsafe area during bag cycle, and manual process block 4204, select feed hold, flow to automated process block 4206, stop all axes motion. Manual process block 4208 is operator intervention. Manual process block 4210 is select bag cycle start or sequence increment/decrement buttons. The system flow then goes to process block 2200, laminate parts.

Figure 29:
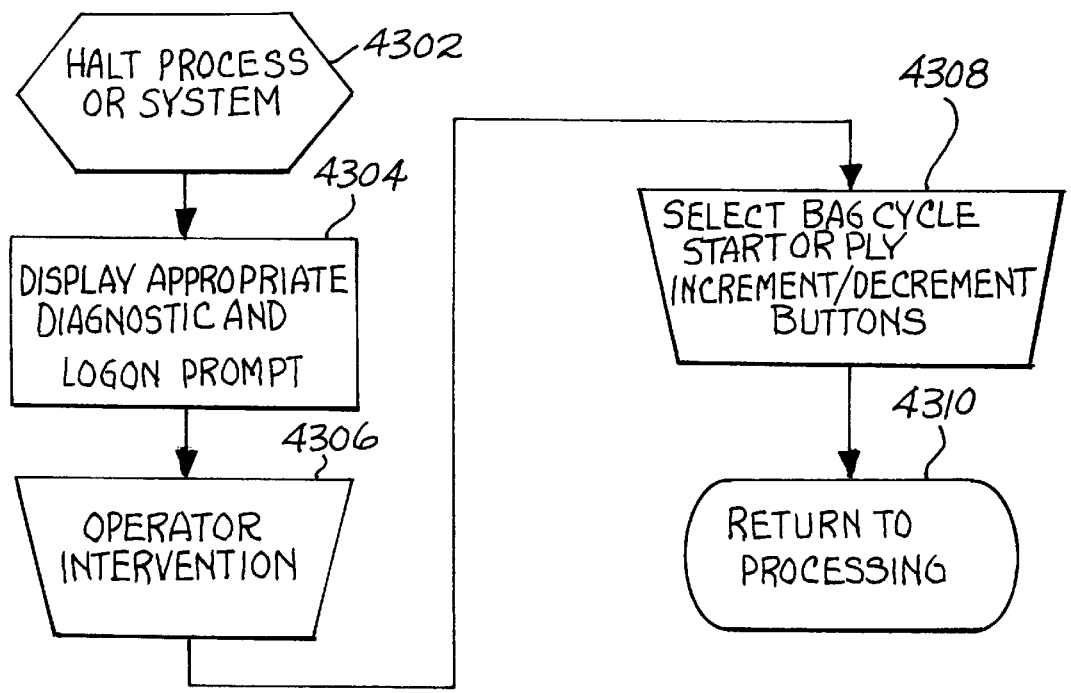

FIG. 29 shows the steps of process block 4300, recover from system error, from FIG. 26. Automated process block 4302 is halt process or system. Block 4304 displays the appropriate diagnostic and the logon prompt. Manual process block 4306 is operator intervention. Manual process block 4308 is select bag cycle start or ply increment/decrement buttons. Process block 4310 is return to processing.

Figure 30:
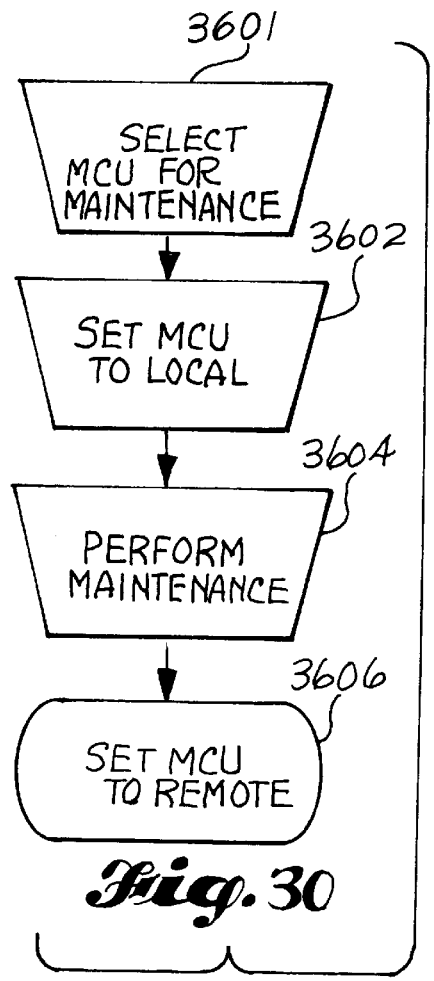

FIG. 30 shows the steps of process block 4400, perform maintenance, from FIG. 26. As shown in FIG. 30, manual process block 3601 is select MCU for maintenance. (MCU stands for Machine Control Unit (i.e., the controller).) Manual process block 3602 is set MCU to local. Manual process block 3604 is perform maintenance. Process block 3606 is set MCU to remote.

Figure 31:
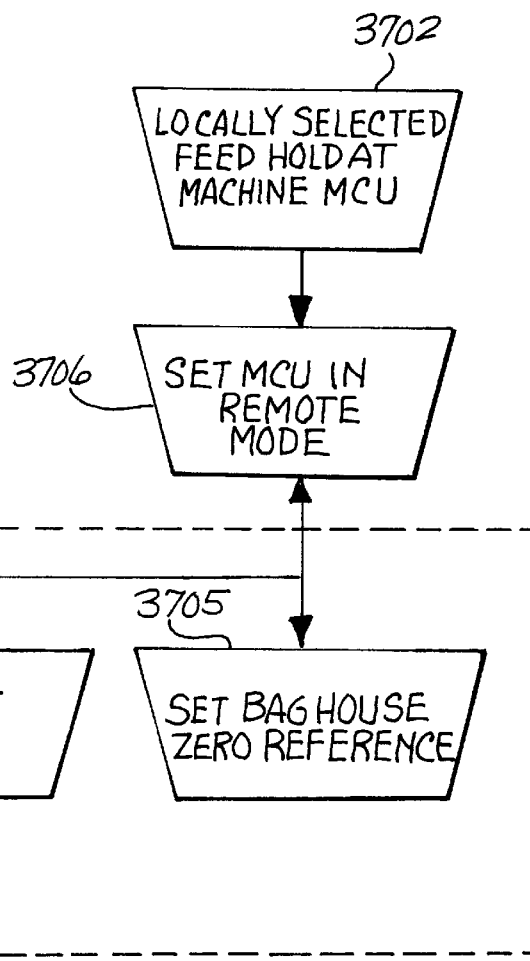

FIG. 31 shows the steps of process block 4500, control machine manually, from FIG. 26. As shown in FIG. 31, manual process block 3702 is locally selected feed hold at machine MCU. Manual process block 3706 is set MCU in remote mode. Manual process block 3703 is local functions as required. Manual process block 3704 is select JOG. (A JOG switch is a switch that allows the operator to move some machine element in increments or in individual axes.) Manual process block 3705 is set bag house zero reference. It may be noted that many machine functions are machine specific. Furthermore, all machine functions may not be on all controllers.

Second Embodiment

Apparatus Description

Figure 32:
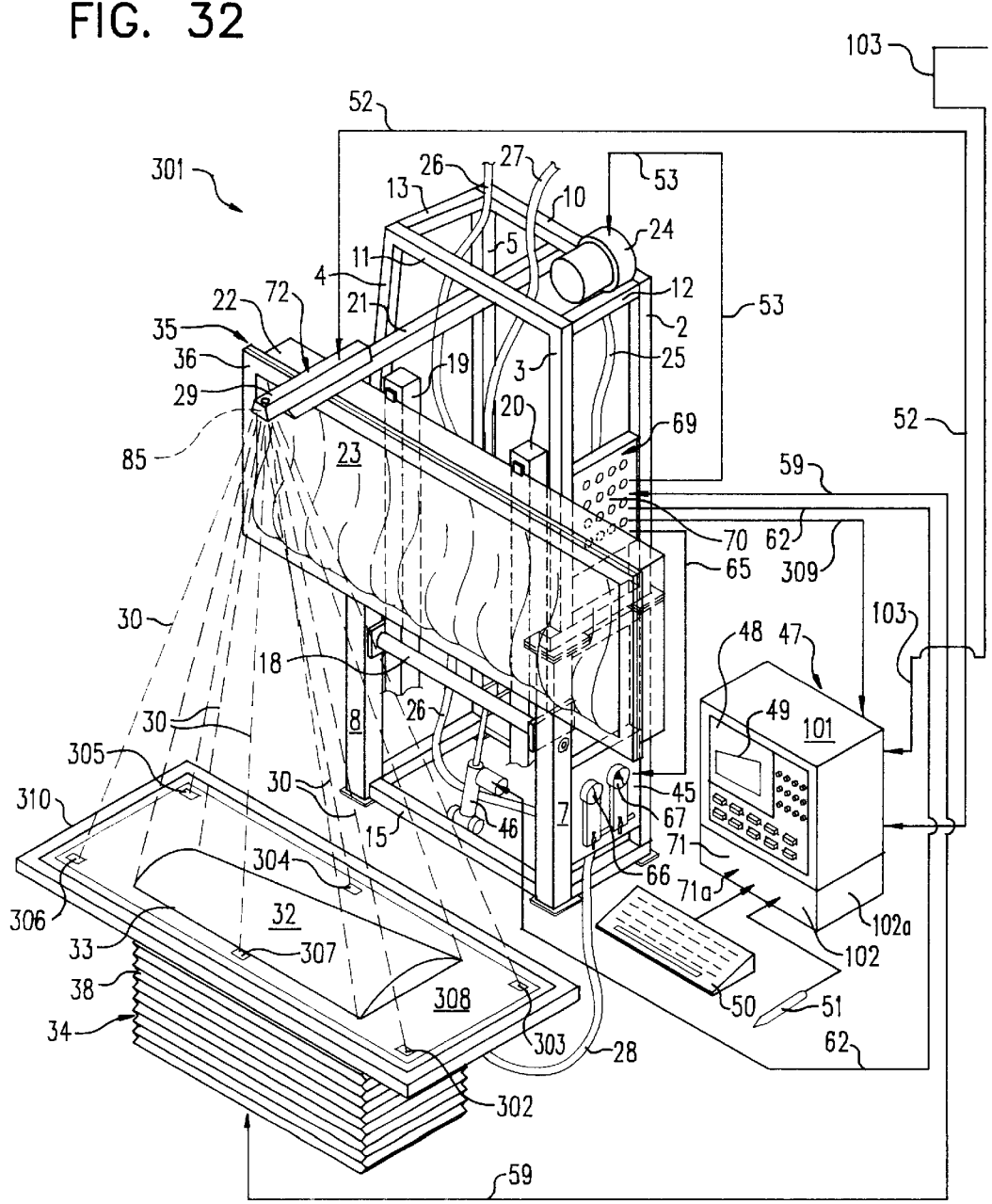
FIG. 32 is a simplified perspective view of the second embodiment of the hand assisted lamination (HAL) system apparatus.

FIG. 32 shows the second embodiment of the invention, the HAL cell 301. The HAL cell 301 is similar to the HAL cell 1 of FIG. 1, except that the cell 301 employs co-operative targets 302, 303, 304, 305, 306, and 307 that are mounted in the lay-up tool 308. The co-operative targets may be, for example, retro-reflective targets. Other examples are stated on page 12 of the Palmateer patent application 89-299A which is incorporated here by reference. The use of the co-operative targets eliminates the use of the electrical communication lines 57, 58, 60, and 61 shown in FIG. 1.

The use of the co-operative targets, the design of the OLT head required to implement that use, and the solving engine written in C for computing and loading the partial derivatives for solving the position of the OLT projector head and the orientation of the angle cosine matrix are explained in the Palmateer patent application 89-299A incorporated by reference herein.

In other respects, the apparatus in the HAL cell 301 is the same as the HAL cell 1 of FIG. 1 and the description of the HAL cell 1 above is incorporated here by reference because that description applies to the HAL cell 301 of FIG. 32.

Process Description

As explained above, the HAL cell 301 is similar to the HAL cell 1 of FIG. 1, except that the cell 301 employs the co-operative targets 302, 303, 304, 305, 306, and 307 that are mounted in the lay-up tool 308. The use of the co-operative targets eliminates the use of the electrical communication lines 57, 58, 60, and 61 shown in FIG. 1. The use of co-operative targets is explained in the Palmateer patent application 89-299A incorporated by reference herein.

Thus the process routines and subroutines of the HAL cell 301 are the same as for the HAL cell 1 of FIG. 1 and the description of the process routines and subroutines of the HAL cell 1 described in the flow charts of FIGS. 13–31 above are incorporated here by reference because that description applies equally to the HAL cell 301 of FIG. 32.

Third Embodiment

Apparatus Description

Figure 33:
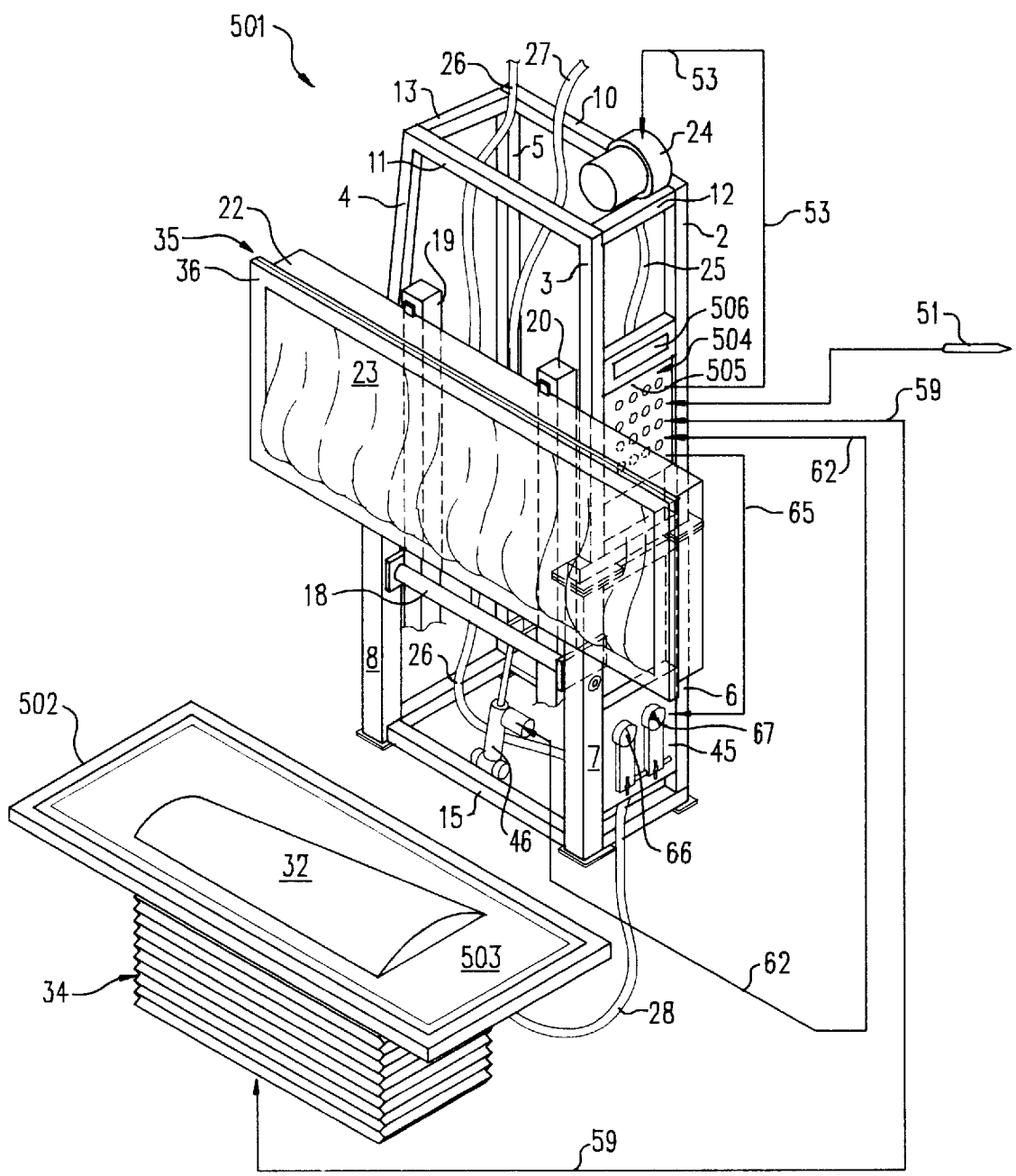
FIG. 33 is a simplified perspective view of the third embodiment of the hand assisted lamination (HAL) system apparatus.

FIG. 33 shows the third embodiment of the invention, the HAL cell 501. The HAL cell 501 does not employ a laser projection system; thus, the table 502 need not have reference sensor targets and the lay-up tool 503 need not have co-operative targets. The operator will employ a hand lay-up template to mark the position and orientation of the plies on the lay-up tool 503.

The Control System

In FIG. 33, a programmable logic controller 504 is located inside the control panel 505 mounted on the right side of the machine between the frame members 2 and 3. A suitable programmable logic controller for this purpose is the Allen-Bradley PLC-5. The controller 504 has sufficient control logic to prevent or minimize the possibility of operator errors. This is accomplished by automatically presenting the status of the machine operations on the visual display screen 506 in order to monitor the machine operations and instruct the operator. In FIG. 33, the display device 506 is mounted above the panel 505. A suitable display device for this purpose is the Allen-Bradley DataLiner that has a two-line digital display. The purpose of the display device 506 is to provide an ongoing report as to the cell status, current cycle information, and any alarm conditions that may exist.

The controller 504 is controlled by a fixed control program or a canned program which assures that the forming process, the vacuum level, and the time-at-vacuum are consistently operated. The operator is provided with specific function buttons on the control panel 505 in order to operate the HAL cell 501 during the forming and compaction cycles of the lamination process.

The function buttons are as follows:

(1) The function button for start form/compact cycle. This button will cause the system to deploy the bag to finish forming the composite material over the lay-up tool and to provide the vacuum compaction cycle of the lay-up process. The vacuum pressure and the time at vacuum is controlled by the system. The timing does not begin until a preset level of vacuum is achieved.

(2) The function buttons for high and low vacuum. The high vacuum button will cause a vacuum level of 22 inches of mercury or greater to be applied to the ply. The low vacuum button will cause a vacuum level of 8–10 inches of mercury to be applied to the ply. The low vacuum button is used in the situation where a honeycomb core is part of the construction. The low vacuum level will prevent part defects in this situation.

(3) The function button for table ergonomics. This button will enable the operator to set the table to the correct working height for this operator in order to avoid back strain.

After marking the ply on the lay-up tool 503 using a hand lay-up template, the operator will get the ply from a storage shelf and lay the ply on the lay-up tool. Then the operator will return to the control panel 505 and press the function button mounted on the face of the panel to start the form/compact cycle. Thus, the HAL cell 501, having its programmed controller 504 and the visual display screen 506, will enable the operator to always follow the correct operational cycle. This will result in final parts having improved quality assurance.

Process Description

The simplified process routine and subroutines of the third embodiment, the HAL cell 501 of FIG. 33, may be described as follows. First, a driver brings to the work cell a transportation cart that delivers a new lay-up tool and a work order. The operator checks the work order against the tool/kit. The operator places the compaction table 502 in the first position, the low position. The driver shuttles the cart to the docking position and activates the table lock button. The driver activates the safety pins and roller balls. The driver activates the cart shuttle rolls and transfers the tool from the cart to the compaction table. The driver places the lay-up tool in the correct position for the operator and the transfer balls and safety pins are deactivated. The driver deactivates the table lock and dispatches the cart to the next station.

The operator places the compaction table at a comfortable working height. If adhesive is required on the lay-up tool surface, it is applied and a three minute compaction cycle takes place. The operator places the first ply on the lay-up tool for compaction. The operator checks the work order to verify the vacuum level for compaction. The operator selects the correct level of vacuum, either high or low. The operator presses the compaction button. The cell status light flashes yellow and the motion horn sounds. The compaction table lowers. The compaction box blower starts. The compaction box starts deployment and reaches the deployed position. Then the compaction table starts to raise and continues rising until it reaches the height where the compaction table and the compaction box are in the coupled position. The vacuum is then activated and the desired vacuum is attained.

The operator bugs ply off planing paper. The operator prepares the next ply. The timer starts and after the correct amount of time the timer stops. The vacuum is vented to the atmosphere. The system vents the tool/bag interface with shop air. The compaction box returns to the stowed position. The compaction box blower stops. The compaction table returns to the home position or to the operator's height. The operator is ready for the next ply.

The cell status light shines green. The work cycle is repeated until the part is completed. When the part is completed, the operator places an autoclave bag over the completed part and the lay-up tool. The operator calls for the transportation cart. The transportation cart arrives with a new lay-up tool and the new work order for the next part. The operator places the compaction table in the second position, the high position. The driver then shuttles the cart to the docking position. The driver activates the table lock button. Then the driver activates the safety pins and roller balls. The driver now activates the cart shuttle rolls and transfers the completed part and the lay-up tool to the cart and the off load is complete. The transfer balls and safety pins are deactivated. The driver deactivates the table lock. The operator or the driver places the compaction table in the first position, the low position. The driver activates the table lock button. The driver activates the safety pins and roller balls. The driver activates the cart shuttle rolls and transfers the new lay-up tool to the table. The driver places the new lay-up tool in the correct position for the operator. The transfer balls and safety pins are deactivated. The driver deactivates the table lock. The driver dispatches the cart to the autoclave station.

As will be apparent to those skilled in the art to which the invention is addressed, the present invention may be embodied in forms other than those specifically disclosed above, without departing from the spirit or essential characteristics of the invention. The particular embodiments of the invention described above and the particular details of the processes described are therefore to be considered in all respects as illustrative and not restrictive. The scope of the present invention is as set forth in the appended claims rather than being limited to the examples set forth in the foregoing description. Any and all equivalents are intended to be embraced by the claims.

What is claimed is:

1. A hand assisted process for making a laminated composite article, said process comprising:
    (a) providing a support table;
    (b) providing a lay-up tool, and positioning said lay-up tool on said support table;
    (c) outlining the location of a ply by projecting a laser beam onto said lay-up tool at the points defined by a data set;
    (d) manually laying down a ply of a composite laminating material on said lay-up tool in said location outlined by said laser beam;
    (e) forming and compacting said ply on said lay-up tool by using a forming/compaction bag and by drawing a vacuum through said support table; and
    (f) repeating steps (c)–(e) until said laminated composite article is complete.

2. The process of claim 1 wherein said laminated composite article has a three-dimensional contoured shape, said lay-up tool has a three-dimensional contoured surface, and said data set is a three-dimensional data set.

3. The process of claim 1 wherein a computer controls said laser beam, said forming/compaction bag, and said drawing of a vacuum.

4. A hand assisted process for making a laminated composite article, said process comprising:
(a) providing a support table having a plurality of reference sensors for providing positional data;
(b) providing a lay-up tool, and positioning said lay-up tool on said support table;
(c) outlining the location of a ply by projecting a laser beam onto said lay-up tool at the points defined by a data set;
(d) manually laying down a ply of a composite laminating material on said lay-up tool in said location outlined by said laser beam;
(e) forming and compacting said ply on said lay-up tool by using a forming/compaction bag and by drawing a vacuum through said support table; and
(f) repeating steps (c)–(e) until said laminated composite article is complete.

5. The process of claim 4 wherein said laminated composite article has a three-dimensional contoured shape, said lay-up tool has a three-dimensional contoured surface, and said data set is a three-dimensional data set.

6. The process of claim 4 wherein a computer controls said laser beam, said forming/compaction bag, and said drawing of a vacuum.

7. A hand assisted process for making a laminated composite article, said process comprising:
(a) providing a support table;
(b) providing a lay-up tool having a plurality of co-operative targets for providing positional data, and positioning said lay-up tool on said support table;
(c) outlining the location of a ply by projecting a laser beam onto said lay-up tool at the points defined by a data set;
(d) manually laying down a ply of a laminating material on said lay-up tool in said location outlined by said laser beam;
(e) forming and compacting said ply on said lay-up tool by using a forming/compaction bag and by drawing a vacuum through said support table; and
(f) repeating steps (c)–(e) until said laminated composite article is complete.

8. The process of claim 7 wherein said laminated composite article has a three-dimensional contoured shape, said lay-up tool has a three-dimensional contoured surface, and said data set is a three-dimensional data set.

9. The process of claim 7 wherein a computer controls said laser beam, said forming/compaction bag, and said drawing of a vacuum.

10. A hand assisted process for making a laminated composite article, said process comprising:
(a) providing a support table being capable of vertical height adjustment under the control of an electronic control system;
(b) providing a lay-up tool, and positioning said lay-up tool on said support table;
(c) manually marking the location of a ply on said lay-up tool by using a hand lay-up template;
(d) laying down a ply of a composite laminating material in said location marked on said lay-up tool in the location indicated by said marking;
(e) forming and compacting said ply on said lay-up tool by using a forming/compaction bag under the control of said electronic control system, by moving said support table vertically under the control of said electronic control system against said compaction bag, and by drawing a vacuum through said support table under the control of said electronic control system; and
(f) repeating steps (c)–(e) until said laminated composite article is complete.

11. The process of claim 10 wherein said laminated composite article has a three-dimensional contoured shape and said lay-up tool has a three-dimensional contoured surface.

12. The process of claim 10 wherein said electronic control system is a programmable logic controller.

13. A hand assisted lamination apparatus for use in making a laminated composite article, said apparatus comprising:
(a) a lay-up tool for receiving plies of a composite laminating material;
(b) a support table for supporting said lay-up tool;
(c) a vacuum/compressed air system for drawing a vacuum through said support table and for feeding compressed air through said support table;
(d) a laser projection system for outlining the location of a ply of said composite laminating material to guide the human operator of said hand assisted lamination apparatus, said laser projection system being capable of projecting a laser beam onto said lay-up tool whereby said laser beam will trace the ply outline defined by a data set;
(e) a forming/compaction bag system for forming and compacting a ply of composite laminating material laid on said lay-up tool; and
(f) an electronic control system for controlling said vacuum/compressed air system, for controlling said laser projection system, and for controlling said forming/compaction bag system.

14. The apparatus of claim 13 wherein said laminated composite article has a three-dimensional contoured shape, said lay-up tool has a three-dimensional contoured surface, and said data set is a three-dimensional data set.

15. The apparatus of claim 13 wherein said electronic control system is a programmed computer control system.

16. A hand assisted lamination apparatus for use in making a laminated composite article, said apparatus comprising:
(a) a lay-up tool for receiving plies of a composite laminating material;
(b) a support table for supporting said lay-up tool, said support table having a plurality of reference sensors located thereon;
(c) a vacuum/compressed air system for drawing a vacuum through said support table and for feeding compressed air through said support table;
(d) a laser projection system for outlining the location of a ply of said composite laminating material to guide the human operator of said hand assisted lamination apparatus, said laser projection system being capable of projecting a laser beam onto said lay-up tool whereby said laser beam will trace the ply outline defined by a data set,
said plurality of reference sensors having the same coordinate system as said data set of said beam tracing said ply outline;
(e) a forming/compaction bag system for forming and compacting a ply of composite laminating material laid on said lay-up tool; and (f) an electronic control system for controlling said vacuum/compressed air system, for controlling said laser projection system, and for controlling said forming/compaction bag system.

17. The apparatus of claim 16 wherein said laminated composite article has a three-dimensional contoured shape, said lay-up tool has a three-dimensional contoured surface, and said data set is a three-dimensional data set.

18. The apparatus of claim 16 wherein said electronic control system is a programmed computer control system.

19. A hand assisted lamination apparatus for use in making a laminated composite article, said apparatus comprising:

(a) a lay-up tool for receiving plies of a composite laminating material, said lay-up tool having a plurality of co-operative targets located thereon;

(b) a support table for supporting said lay-up tool;

(c) a vacuum/compressed air system for drawing a vacuum through said support table and for feeding compressed air through said support table;

(d) a laser projection system for outlining the location of a ply of said composite laminating material to guide the human operator of said hand assisted lamination apparatus, said laser projection system being capable of projecting a laser beam onto said lay-up tool whereby said laser beam will trace the ply outline defined by a data set, said plurality of co-operative targets having the same coordinate system as said data set of said laser beam tracing said ply outline;

(e) a forming/compaction bag system for forming and compacting a ply of composite laminating material laid on said lay-up tool; and (f) an electronic control system for controlling said vacuum/compressed air system, for controlling said laser projection system, and for controlling said forming/compaction bag system.

20. The apparatus of claim 19 wherein said laminated composite article has a three-dimensional contoured shape, said lay-up tool has a three-dimensional contoured surface, and said data set is a three-dimensional data set.

21. The apparatus of claim 19 wherein said electronic control system is a pro-grammed computer control system.

22. A hand assisted lamination apparatus for use in making a laminated composite article, said apparatus comprising:

(a) a lay-up tool for receiving plies of a composite laminating material;

(b) a support table for supporting said lay-up tool, said support table being capable of vertical height adjustment;

(c) a vacuum/compressed air system for drawing a vacuum through said support table and for feeding compressed air through said support table;

(d) a forming/compaction bag system for forming and compacting a ply of composite laminating material laid on said lay-up tool;

(e) an electronic control system for controlling said support table, for controlling said vacuum/compressed air system, and for controlling said forming/compaction bag system; and (f) a visual display screen for displaying the status of machine operations so that the human operator may monitor said machine operations and for displaying operational instructions to guide the human operator of said hand assisted lamination apparatus.

23. The apparatus of claim 22 wherein said laminated composite article has a three-dimensional contoured shape and said lay-up tool has a three-dimensional contoured surface.

24. The apparatus of claim 22 wherein said electronic control system is a programmable logic controller.

* * * * *